(12) United States Patent
Saito et al.

(10) Patent No.: US 6,208,249 B1
(45) Date of Patent: Mar. 27, 2001

(54) PASSENGER DETECTION SYSTEM

(75) Inventors: Takashi Saito, Osaka; Masahiro Ofuji, Kanagawa; Kazunori Jinno, Osaka, all of (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/146,231

(22) Filed: Sep. 3, 1998

(30) Foreign Application Priority Data

Sep. 3, 1997 (JP) .................................................. 9-238272
Sep. 3, 1997 (JP) .................................................. 9-238296

(51) Int. Cl.$^7$ .................................................. G08B 13/26
(52) U.S. Cl. ........................ 340/561; 340/562; 340/573.1
(58) Field of Search .................................. 340/435, 561, 340/562, 565, 870.37, 573.4, 436; 324/663, 671, 687; 280/728.1, 728.2, 734, 735; 180/271, 273

(56) References Cited

U.S. PATENT DOCUMENTS

| 5,394,292 | * | 2/1995 | Hayashida | ............................ | 340/435 |
| 5,760,688 | * | 6/1998 | Kasai | .................................. | 340/561 |
| 5,845,000 | * | 12/1998 | Breed et al. | ......................... | 382/100 |
| 6,066,954 | * | 5/2000 | Gershenfeld et al. | ................ | 324/671 |

FOREIGN PATENT DOCUMENTS 9-42650   2/1997   (JP) .

* cited by examiner

Primary Examiner—Vane T. Trieu
(74) Attorney, Agent, or Firm—Sughrue, Mion, Zinn, Macpeak & Seas, PLLC

(57) ABSTRACT

A passenger detection system comprises an antenna electrode, an oscillation circuit, a current detection circuit, a phase difference detection circuit, and a control circuit. The antenna electrode is placed on the upper side of a seat. The oscillation circuit generates a high frequency low voltage oscillation signal in order to generate a weak alternating electric field around the antenna electrode. The current detection circuit detects a transmission current which passes between the oscillation circuit and the antenna electrode according to the weak alternating electric field which is generated around the antenna electrode. The phase difference detection circuit detects the phase difference between the oscillation signal supplied from the oscillation circuit and an output signal which is supplied to the antenna electrode. And the presence or absence of a passenger seated on the seat is judged by the control circuit based on the outputs of the current detection circuit and the phase difference detection circuit. Especially, the passenger detection system needs only one antenna electrode, therefore judgment on the presence or absence of a passenger seated on the seat can be executed with simplified circuit composition and low cost.

27 Claims, 22 Drawing Sheets

F I G. 14A
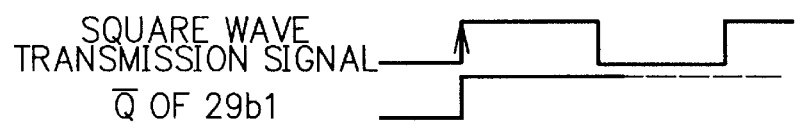
SQUARE WAVE
TRANSMISSION SIGNAL
$\overline{Q}$ OF 29b1
F I G. 14B
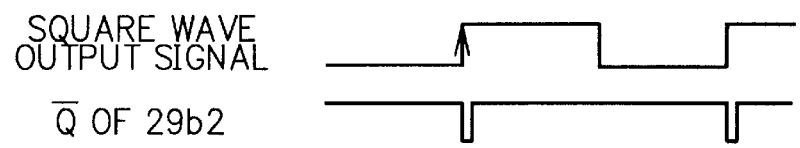
SQUARE WAVE
OUTPUT SIGNAL
$\overline{Q}$ OF 29b2
F I G. 14C
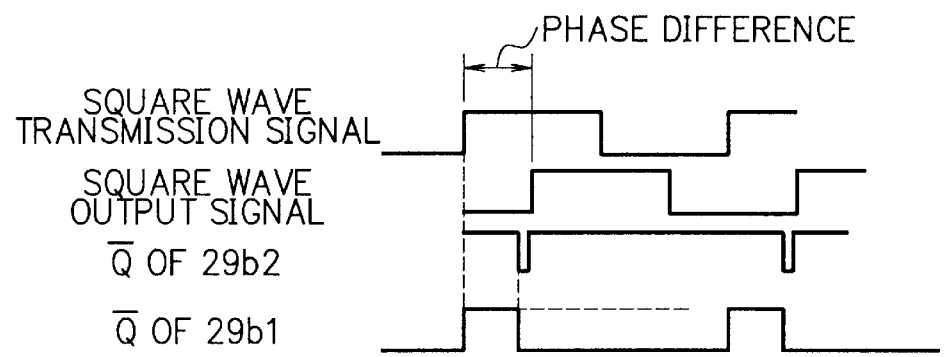
PHASE DIFFERENCE
SQUARE WAVE
TRANSMISSION SIGNAL
SQUARE WAVE
OUTPUT SIGNAL
$\overline{Q}$ OF 29b2
$\overline{Q}$ OF 29b1

PASSENGER DETECTION SYSTEM

BACKGROUND OF THE INVENTION

The present invention relates to a passenger detection system, and in particular, to a passenger detection system which can detect the presence or absence of a passenger seated on a seat of a vehicle which is provided with an air bag unit, seatbelts, etc., by means of a simple method and equipment.

1. Description of the Prior Art

Air bag units for absorbing shocks and providing relief from impact damage of car passengers in cases of collisions have become indispensable gear for car safety, and are being provided not only to driver's seats but also to passenger seats in recent years.

FIG. 1 is a circuit diagram showing a conventional circuit employed in air bag systems. The circuit of FIG. 1 comprises a driver's seat squib circuit composed of a series connection of a safety sensor SS1 such as a mechanical accelerometer, a squib SQ1, and a semiconductor switching device SW1 such as an FET (Field-Effect Transistor), and a passenger seat squib circuit composed of a series connection of a safety sensor SS2, a squib SQ2, and a semiconductor switching device SW2 such as an FET, and an electronic accelerometer (collision sensor) AM for detecting negative acceleration due to collisions, and a control circuit CC provided with functions for judging the presence or absence of a collision according to an output signal of the electronic accelerometer AM and supplying signals to the gates of the semiconductor switching devices SW1 and SW2.

When a car provided with the air bag system collided with something, switches of the safety sensors SS1 and SS2 is closed with relatively small negative acceleration enabling the driver's seat squib circuit and the passenger seat squib circuit. If the control circuit CC judged that the car actually collided with something according to the output signal from the electronic accelerometer AM, the control circuit CC supplies signal to the gates of the semiconductor switching devices SW1 and SW2 and the semiconductor switching devices SW1 and SW2 are turned ON, thereby currents are passed through the two squib circuits. Due to the currents, the squibs SQ1 and SQ2 are heated and thereby the air bags for the driver's seat and the passenger seat are deployed to protect the passengers from impact damage by the collision.

Incidentally, such an air bag system is effective for saving the passenger in the case where an adult person P is seated on the seat 1 as shown in FIG. 2A. However, in the case where an infant SP is seated on an infant seat 1A fixed on the passenger seat facing rear (hereafter referred to as 'RFIS (Rear Facing Infant Seat)' as shown in FIG. 2B, deployment of the air bag might hurt the infant, and thus it is preferable that the air bag does not deploy on the collision. Further, in the case where a child SP' is seated on a child seat 1A' fixed on the passenger seat facing forward (hereafter referred to as 'FFCS (Forward Facing Child Seat)' as shown in FIG. 2C, deployed air bag might cover the face of the child SP' and suffocate the child SP', and thus it is preferable that the air bag does not deploy on the collision similarly to the case of RFIS.

As a countermeasure against the above problems, a circuit for air bag systems shown in FIG. 3 has been proposed, for example. The circuit of FIG. 3 further comprises a passenger detection sensor device SD for detecting the status of the passenger on the passenger seat. The control circuit CC judges whether or not a passenger is seated on the passenger seat and the status of the passenger on the passenger seat, according to a detection signal from the passenger detection sensor device SD, and sets itself at deployment mode in which the control circuit CC deploys the air bag on collision, or at no deployment mode in which the control circuit CC does not deploy the air bag on collision. As the passenger detection sensor device SD, a device employing a weight sensor and a device employing image processing have been proposed. In the method employing image processing, the passenger is shot by a camera and it is judged whether the passenger is an adult person P or a child SP' or an infant SP by means of image processing.

By the first method employing a weight sensor, whether the passenger is an adult P or a child SP' or an infant SP can roughly be judged and the above unexpected accidents can basically be avoided by the setting of the control circuit CC into the deployment mode or the no deployment mode based on the judgment. However, such a method employing a weight sensor lacks precision since weight varies widely among individuals and there exist cases where a child SP' weighs more than a very thin adult person P. Further, it is impossible to judge whether the status of a little child on the passenger seat is RFIS or FFCS.

By the second method employing image processing, it is possible to judge rather precisely whether or not a passenger is seated on the passenger seat, whether the passenger is an adult P or a child SP' or an infant SP, and whether the status of a little child on the passenger seat is RFIS or FFCS. However, image processing and pattern matching against various kinds of patterns have to be executed to image data obtained by a camera, and thus complex and expensive image processing device is needed.

2. Description of Related Art

In order to resolve the above problems, the present inventors have lately proposed a passenger detection system shown in FIG. 4A through FIG. 8 (Japanese Patent Application No.HEI9-42650). The system utilizes disturbance in a weak alternating electric field which is generated between two electrodes placed on a seat. Referring to FIG. 4A, an oscillator for generating high frequency low voltage is connected to an electrode E1, and another electrode E2 is grounded. An alternating electric field is generated between the electrodes E1 and E2 according to the potential difference between the electrodes E1 and E2, thereby a displacement current Id occurs between the electrode E2 and the ground. In this situation, if an object OB is placed in the electric field as shown in FIG. 4B, the electric field is disturbed by the object OB and thereby the displacement current Id varies into Id1. Almost every object OB can be represented by a conductance and a capacitance, and the object OB is regarded to be connected to the ground via the capacitance.

As shown above, the displacement current varies depending on whether or not an object OB exists on a seat of a car, and the status of a passenger on the seat can be detected by utilizing the phenomenon. Especially, a lot of information about an object on the seat including a passenger can be obtained by increasing the number of electrodes which are placed on the seat, thereby precise detection of the situation on the seat can be executed.

In the following, a concrete example of a passenger detection system utilizing the phenomenon will be described referring to FIG. 5 through FIG. 8. FIG. 5 is a perspective view of a passenger seat which is provided with the passenger detection system which has been proposed by the present inventors. A plurality of electrodes are placed on the upper side of the passenger seat 1. Concretely, electrodes E1 and E2 of quadrangular shapes for example are placed apart on the cushion section 1a, and electrodes E3 and E4 of almost the same shapes are placed apart on the back section 1b. The electrodes E1~E4 are formed of electrically conductive fabrics in consideration of comfort of the passenger. However the electrodes E1~E4 can also be formed by weaving stringy metal in fabric which covers the seat, by applying electrically conductive paint on fabric which covers the seat, etc., or it is also possible to form the electrodes E1~E4 by metal plates. The electrodes E1~E4 are connected to a circuit which is shown in FIG. 6 and FIG. 7.

Referring to FIG. 6, the passenger detection system comprises an oscillator circuit 10 for generating high frequency low voltage (for example, 100 Khz and 10~12V), a loading current detection circuit 11, a transmission/reception switching circuit 12, a current-voltage converter circuit 13 provided with amplification capability, a detection circuit (demodulation circuit) 14 provided with band passing (unnecessary noise reduction) capability and AC-DC converting capability, an amplification circuit 15, an offset switching circuit 16, and a control circuit 17 such as an MPU which is connected with an air bag unit 18.

FIG. 7 is a circuit diagram showing more concrete details of FIG. 6. In the passenger detection system of FIG. 6 and FIG. 7, the amplification circuit 15 is composed of a first amplification circuit 15A whose gain is ×1 and a second amplification circuit 15B whose gain is ×100, and an analog selection circuit 19 is provided for selecting one of the outputs of the first and the second amplification circuits 15A and 15B according to control of the control circuit 17.

The loading current detection circuit 11 is, for example, composed of an impedance device such as a resistor 11a which is inserted to the circuit in series and an amplifier 11b for amplifying the terminal voltage of the resistor 11a, and a current supplied from the oscillator circuit 10 to a particular selected electrode (i.e. the loading current) is detected by the loading current detection circuit 11. The transmission/reception switching circuit 12 is composed of, for example, switching means Aa~Ad for connecting the output of the oscillator circuit 10 to an electrode which is selected out of the electrodes E1~E4 (hereafter referred to as a 'transmission electrode') and switching means Ba~Bd for connecting electrodes other than the transmission electrode (hereafter referred to as 'reception electrodes') to the current-voltage converter circuit 13, in which switching of the switching means Aa~Ad and Ba~Bd is controlled by the control circuit 17. Incidentally, it is preferable that the transmission/reception switching circuit 12 is composed of a multiplexer circuit. The current-voltage converter circuit 13 is composed of, for example, impedance devices such as resistors 13a for converting the displacement current passing through the reception electrodes into voltages and amplifiers 13b for amplifying the converted voltages, in which a resistor 13a and an amplifier 13b are provided corresponding to each of the electrodes E1~E4. The analog selection circuit 19 is composed of, for example, four switching means 19a for being switched simultaneously and connecting the outputs of the second amplification circuit 15B to the control circuit 17 and four switching means 19b for being switched simultaneously and connecting the outputs of the first amplification circuit 15A to the control circuit 17.

FIG. 8 is a circuit diagram showing an example of a circuit which is employed in the air bag unit 18. The circuit of FIG. 8 is basically the same as the circuits of FIG. 1 and FIG. 3, except that the control circuit CC is connected with the control circuit 17 of the circuit of FIG. 6 and FIG. 7.

In the following, the operation of the passenger detection system of FIG. 4A through FIG. 8 will be described. First, according to signals from the control circuit 17, only the switching means Aa in the transmission/reception switching circuit 12 is closed in order to connect the output of the oscillator circuit 10 to the electrode E1, and the switching means Bb~Bd are closed in order to connect the electrodes E2~E4 to the current-voltage converter circuit 13. Thus, the high frequency low voltage is applied to the transmission electrode E1 by the oscillator circuit 10, and thereby the displacement currents occurs in the reception electrodes E2~E4. The displacement currents of the reception electrodes E2~E4 are converted into voltages by the resistors 13a and amplified by the amplifiers 13b, and the amplified voltages are supplied to the detection circuit 14. Meanwhile, the loading current passing through the transmission electrode E1 is detected by the loading current detection circuit 11, and the result is supplied to the detection circuit 14 as data R(1,1) which will be explained later. In the detection circuit (demodulation circuit) 14, signal components of the amplified voltages around 100 KHz for example are band passed and unnecessary noise components are rejected, and output signals of the detection circuit 14 are supplied to the first and the second amplification circuits 15A and 15B. Signals from one of the amplification circuits 15A and 15B are properly selected by the operation of the offset switching circuit 16 and the analog selection circuit 19, and the selected signals are supplied to the control circuit 17. For example, when the output signals from the detection circuit 14 can be measured using full-range of the control circuit 17, only the four switching means 19b are simultaneously closed in order to supply the output signals of the first amplification circuit 15A (×1) to the control circuit 17. On the other hand, when the output signals from the detection circuit 14 are so small that subtle variations of the output signals can not be measured using full-range of the control circuit 17, only the four switching means 19a are simultaneously closed in order to supply the output signals of the second amplification circuit 15B (×100) to the control circuit 17. In the control circuit 17, output signals from the amplification circuit 15A or 15B are A/D converted and stored 30 in memory.

Subsequently, according to signals from the control circuit 17, only the switching means Ab in the transmission/reception switching circuit 12 is closed in order to connect the output of the oscillator circuit 10 to the electrode E2, and the switching means Ba, Bc and Bd are closed in order to connect the electrodes E1, E3 and E4 to the current-voltage converter circuit 13. Thus, the high frequency low voltage is applied to the transmission electrode E2 by the oscillator circuit 10, and thereby the displacement currents occurs in the reception electrodes E1, E3 and E4. The displacement currents of the reception electrodes E1, E3 and E4 are converted into voltages by the resistors 13a and amplified by the amplifiers 13b, and the amplified voltages are supplied to the detection circuit 14. Meanwhile, the loading current passing through the transmission electrode E2 is detected by the loading current detection circuit 11, and the result is supplied to the detection circuit 14 as data R(2,2) which will be explained later. Output signals from the detection circuit 14 are processed in the same way as above and the processed data are stored in memory of the control circuit 17.

Subsequently, only the switching means Ac is closed in order to connect the output of the oscillator circuit 10 to the electrode E3, and the switching means Ba, Bb and Bd are closed in order to connect the electrodes E1, E2 and E4 to the current-voltage converter circuit 13. Thus, the high frequency low voltage is applied to the transmission electrode E3 by the oscillator circuit 10, and thereby the displacement currents occurs in the reception electrodes E1, E2 and E4. The displacement currents of the reception electrodes E1, E2 and E4 are converted into voltages by the resistors 13a and amplified by the amplifiers 13b, and the amplified voltages are supplied to the detection circuit 14. Meanwhile, the loading current passing through the transmission electrode E3 is detected by the loading current detection circuit 11, and the result is supplied to the detection circuit 14 as data R(3,3) which will be explained later. Output signals from the detection circuit 14 are processed in the same way as above and the processed data are stored in memory of the control circuit 17.

Subsequently, only the switching means Ad is closed in order to connect the output of the oscillator circuit 10 to the electrode E4, and the switching means Ba, Bb and Bc are closed in order to connect the electrodes E1, E2 and E3 to the current-voltage converter circuit 13. Thus, the high frequency low voltage is applied to the transmission electrode E4 by the oscillator circuit 10, and thereby the displacement currents occurs in the reception electrodes E1, E2 and E3. The displacement currents of the reception electrodes E1, E2 and E3 are converted into voltages by the resistors 13a and amplified by the amplifiers 13b, and the amplified voltages are supplied to the detection circuit 14. Meanwhile, the loading current passing through the transmission electrode E4 is detected by the loading current detection circuit 11, and the result is supplied to the detection circuit 14 as data R(4,4) which will be explained later. Output signals from the detection circuit 14 are processed in the same way as above and the processed data are stored in memory of the control circuit 17.

Then, the control circuit 17 calculates the seating pattern on the passenger seat 1 by executing arithmetic logic operation to the data. Various types of seating patterns are prestored in the control circuit 17, and a seating pattern which has been calculated using various combinations of a transmission electrode and reception electrodes chosen from the electrodes E1~E4 is compared with the prestored seating patterns and one or more matched seating patterns are extracted from the prestored seating patterns in order to judge the status of the passenger on the passenger seat 1. The control circuit 17 regards the following typical seating patterns as objects of matching, for example, a 'vacant seat pattern' in which no passenger is seated on the passenger seat 1, a 'FFCS pattern' in which a child is seated on the passenger seat 1 in FFCS, a 'RFIS pattern' in which an infant is seated on the passenger seat 1 in RFIS, and a 'person pattern' in which an adult person is seated on the passenger seat 1. By various combinations of a transmission electrode and reception electrodes chosen from the electrodes E1~E4, a plurality of data which are generally represented as R(i, j) can be obtained. Here, R(i, j) in which i=j is transmission data, and R(i, j) in which i . j is reception data in which i and j are representing a transmission electrode and a reception electrode respectively. The control circuit 17 executes arithmetic logic operation using 16 pieces of data R(i, j) for example, and extracts characteristics of the seating pattern.

Then, a signal according to the seating pattern determined by the control circuit 17 is transmitted by the control circuit 17 to the air bag unit 18. For example, a signal instructing the air bag unit 18 to set itself at the no deployment mode (in which the air bag unit 18 does not deploy the air bag for the passenger seat 1 on collision) is transmitted by the control circuit 17 in the case where the determined seating pattern is the vacant seat pattern, the FFCS pattern, or the RFIS pattern, and a signal instructing the air bag unit 18 to set itself at the deployment mode (in which the air bag unit 18 deploys the air bag for the passenger seat 1 on collision) is transmitted by the control circuit 17 in the case where the determined seating pattern is other than the above patterns. These signals are received by the control circuit CC of the air bag unit 18, and in the former case, the control circuit CC is set not to supply a gate signal to the semiconductor switching device SW2 on the side of the passenger seat 1 on collision. Incidentally, the semiconductor switching device SW1 on the side of the driver's seat is necessarily supplied with a gate signal on collision. In the latter case, the control circuit CC is set to supply gate signals to the semiconductor switching devices SW1 and SW2 on collision.

According to the above passenger detection system, a plurality of electrodes E1~E4 are placed on the upper side of the passenger seat 1 and a weak alternating electric field due to high frequency low voltage applied between a selected transmission electrode and other reception electrodes is generated, and displacement currents depending on a seating pattern of the passenger on the passenger seat 1 pass through the reception electrodes. Therefore, the seating pattern of the passenger on the passenger seat 1 can be correctly detected by analyzing characteristic patterns in the displacement currents, and thereby the air bag unit 18 can be set at the no deployment mode or the deployment mode according to the seating pattern of the passenger on the passenger seat 1.

Further, the number of the electrodes placed on the passenger seat 1 can be arbitrarily increased and the number of combinations of transmission electrodes and reception electrodes can be increased in order to increase obtained data and execute more precise judgment of the seating pattern of the passenger on the passenger seat 1.

Furthermore, a large number of displacement current patterns corresponding to the 'empty pattern', the 'RFIS pattern', the 'FFCS pattern', 'person pattern', etc. corresponding to each combination of the transmission electrode and the reception electrodes can be stored in the control circuit 17 as the seating patterns. Therefore, actual seating pattern can be detected precisely by use of various combinations of transmission electrodes and reception electrodes and extracting a most probable seating pattern by executing pattern matching.

However, these days, there exist cases where only a function of detecting whether or not a passenger is seated on the passenger seat is required of passenger detection systems, depending on the type of a car. If the above passenger detection system capable of detecting the 'empty pattern', 'RFIS pattern', 'FFCS pattern', 'person pattern', etc. is installed on a car which only requires detection of whether or not a passenger is seated on the passenger seat, only a limited function of the passenger detection system would be used by the car, and thus it becomes overqualification or waste of cost.

It is of course possible to employ a weight sensor as the passenger detection sensor device SD in FIG. 3 for detecting whether or not a passenger is seated on the passenger seat, and cost for the air bag system can be reduced. However, the weight sensor can only detect the weight of one or more articles on the passenger seat, and thus can not discriminate between a passenger and an article other than a passenger. Therefore, other means has to be adopted.

SUMMARY OF THE INVENTION

It is therefore the primary object of the present invention to provide a passenger detection system by which the presence or absence of a passenger seated on the passenger seat can be correctly detected with simplified circuit composition of the system and low cost.

In accordance with a first aspect of the present invention, there is provided a passenger detection system comprising an antenna electrode, an oscillation means, a current detection means, and a judgment means. The antenna electrode is placed on the upper side of a seat. The oscillation means generates a high frequency low voltage oscillation signal in order to generate a weak alternating electric field around the antenna electrode. The current detection means detects a transmission current which passes between the oscillation means and the antenna electrode according to the weak alternating electric field which is generated around the antenna electrode. And the judgment means judges the presence or absence of a passenger seated on the seat based on the output of the current detection means.

In accordance with a second aspect of the present invention, in the first aspect, the passenger detection system further comprises an amplitude control means for controlling the voltage amplitude of the oscillation signal which is supplied by the oscillation means to the antenna electrode at an almost constant value.

In accordance with a third aspect of the present invention, in the second aspect, the amplitude control means includes an amplitude detection circuit and an amplitude variation circuit. The amplitude detection circuit detects the voltage amplitude of the oscillation signal, and the amplitude variation circuit varies and controls the voltage amplitude of the oscillation signal. Variations of the voltage amplitude of the oscillation signal is controlled by the amplitude variation circuit based on the output of the amplitude detection circuit so that the voltage amplitude will be almost constant.

In accordance with a fourth aspect of the present invention, in the first aspect, the antenna electrode is composed of an antenna section, a conduction section and a connector. The antenna section is provided to the cushion section and/or the back section of the seat. The conduction section is formed by extending part of the antenna section. And the connector is provided to the end of the conduction section.

In accordance with a fifth aspect of the present invention, in the first aspect, a control unit is made up by enclosing the oscillation means, the current detection means and the judgment means in a common housing, and the control unit is provided to the seat.

In accordance with a sixth aspect of the present invention, in the fifth aspect, the housing of the control unit is provided with a connector which is connected with the oscillation means via the current detection means, and the connector on the housing of the control unit is electrically connected to a connector which is provided to the end of the antenna electrode.

In accordance with a seventh aspect of the present invention, in the first aspect, the judgment means executes the judgment on the presence or absence of a passenger seated on the seat, by comparing the transmission current detected by the current detection means with a prestored threshold value concerning the transmission current.

In accordance with an eighth aspect of the present invention, in the first aspect, the passenger detection system further comprises a power circuit for generating a single uniform DC voltage utilizing power derived from a car battery. The single uniform DC voltage supplied by the power circuit is utilized as the system power source for circuits in the passenger detection system including the oscillation means, the current detection means and the judgment means.

In accordance with a ninth aspect of the present invention, in the first aspect, the antenna electrode is placed on the upper side of the seat so as to cover almost the entire upper side of the cushion section of the seat.

In accordance with a tenth aspect of the present invention, in the first aspect, the antenna electrode is designed to be provided to both the cushion section and the back section of the seat.

In accordance with an eleventh aspect of the present invention, in the first aspect, the antenna electrode is fixed to one or more components of the seat.

In accordance with a twelfth aspect of the present invention, there is provided a passenger detection system comprising an antenna electrode, an oscillation means, a current detection means, a phase difference detection means, and a judgment means. The antenna electrode is placed on the upper side of a seat. The oscillation means generates a high frequency low voltage oscillation signal in order to generate a weak alternating electric field around the antenna electrode. The current detection means detects a transmission current which passes between the oscillation means and the antenna electrode according to the weak alternating electric field which is generated around the antenna electrode. The phase difference detection means detects the phase difference between the oscillation signal supplied from the oscillation means and an output signal which is supplied to the antenna electrode. And the judgment means judges the presence or absence of a passenger seated on the seat based on the outputs of the current detection means and the phase difference detection means.

In accordance with a thirteenth aspect of the present invention, in the twelfth aspect, the passenger detection system further comprises an amplitude control means for controlling the voltage amplitude of the oscillation signal which is supplied by the oscillation means to the antenna electrode at an almost constant value.

In accordance with a fourteenth aspect of the present invention, in the thirteenth aspect, the amplitude control means includes an amplitude detection circuit and an amplitude variation circuit. The amplitude detection circuit detects the voltage amplitude of the oscillation signal, and the amplitude variation circuit varies and controls the voltage amplitude of the oscillation signal. Variations of the voltage amplitude of the oscillation signal is controlled by the amplitude variation circuit based on the output of the amplitude detection circuit so that the voltage amplitude will be almost constant.

In accordance with a fifteenth aspect of the present invention, in the twelfth aspect, the antenna electrode is composed of an antenna section, a conduction section and a connector. The antenna section is provided to the cushion section and/or the back section of the seat. The conduction section is formed by extending part of the antenna section. And the connector is provided to the end of the conduction section.

In accordance with a sixteenth aspect of the present invention, in the twelfth aspect, a control unit is made up by enclosing the oscillation means, the current detection means, the phase difference detection means and the judgment means in a common housing, and the control unit is provided to the seat.

In accordance with a seventeenth aspect of the present invention, in the sixteenth aspect, the housing of the control unit is provided with a connector which is connected with the oscillation means via the current detection means, and the connector on the housing of the control unit is electrically connected to a connector which is provided to the end of the antenna electrode.

In accordance with an eighteenth aspect of the present invention, in the twelfth aspect, the judgment means executes the judgment on the presence or absence of a passenger seated on the seat, by comparing the transmission current detected by the current detection means with a prestored threshold value concerning the transmission current and comparing the phase difference detected by the phase difference detection means with a prestored threshold value concerning the phase difference.

In accordance with a nineteenth aspect of the present invention, in the twelfth aspect, the passenger detection system further comprises a power circuit for generating a single uniform DC voltage utilizing power derived from a car battery. The single uniform DC voltage supplied by the power circuit is utilized as the system power source for circuits in the passenger detection system including the oscillation means, the current detection means, the phase difference detection means and the judgment means.

In accordance with a twentieth aspect of the present invention, in the twelfth aspect, the antenna electrode is placed on the upper side of the seat so as to cover almost the entire upper side of the cushion section of the seat.

In accordance with a twenty-first aspect of the present invention, in the twelfth aspect, the antenna electrode is designed to be provided to both the cushion section and the back section of the seat.

In accordance with a twenty-second aspect of the present invention, in the twelfth aspect, the antenna electrode is fixed to one or more components of the seat.

In accordance with a twenty-third aspect of the present invention, in the twelfth aspect, the phase difference detection means detects the phase difference between signals at both ends of the current detection means.

In accordance with a twenty-fourth aspect of the present invention, in the twelfth aspect, the phase difference detection means detects the phase difference between the oscillation signal and the output signal, by detecting the phase difference between a rising/falling edge of a square wave signal corresponding to the oscillation signal and a rising/falling edge of a square wave signal corresponding to the output signal.

In accordance with a twenty-fifth aspect of the present invention, in the twelfth aspect, the oscillation means generates the high frequency low voltage oscillation signal substantially in the form of a square wave.

In accordance with a twenty-sixth aspect of the present invention, in the twenty-fifth aspect, an MPU (MicroProcessor Unit) in the passenger detection system is utilized as the oscillation means for generating the high frequency low voltage oscillation in the form of a square wave.

In accordance with a twenty-seventh aspect of the present invention, there is provided a passenger detection system comprising an antenna electrode, an oscillation means, a resistance, a phase difference detection means, and a judgment means. The antenna electrode is placed on the upper side of a seat. The oscillation means generates a high frequency low voltage oscillation signal in order to generate a weak alternating electric field around the antenna electrode. The resistance is placed between the oscillation means and the antenna electrode. The phase difference detection means detects the phase difference between the oscillation signal supplied from the oscillation means and an output signal which is supplied to the antenna electrode. And the judgment means judges the presence or absence of a passenger seated on the seat based on the output of the phase difference detection means.

BRIEF DESCRIPTION OF THE DRAWINGS

The objects and features of the present invention will become more apparent from the consideration of the following detailed description taken in conjunction with the accompanying drawings, in which:

FIG. 14A through FIG. 14C are timing charts showing the operation of the phase difference detection circuit of FIG. 13A;

DESCRIPTION OF THE PREFERRED EMBODIMENTS

Figure 1:
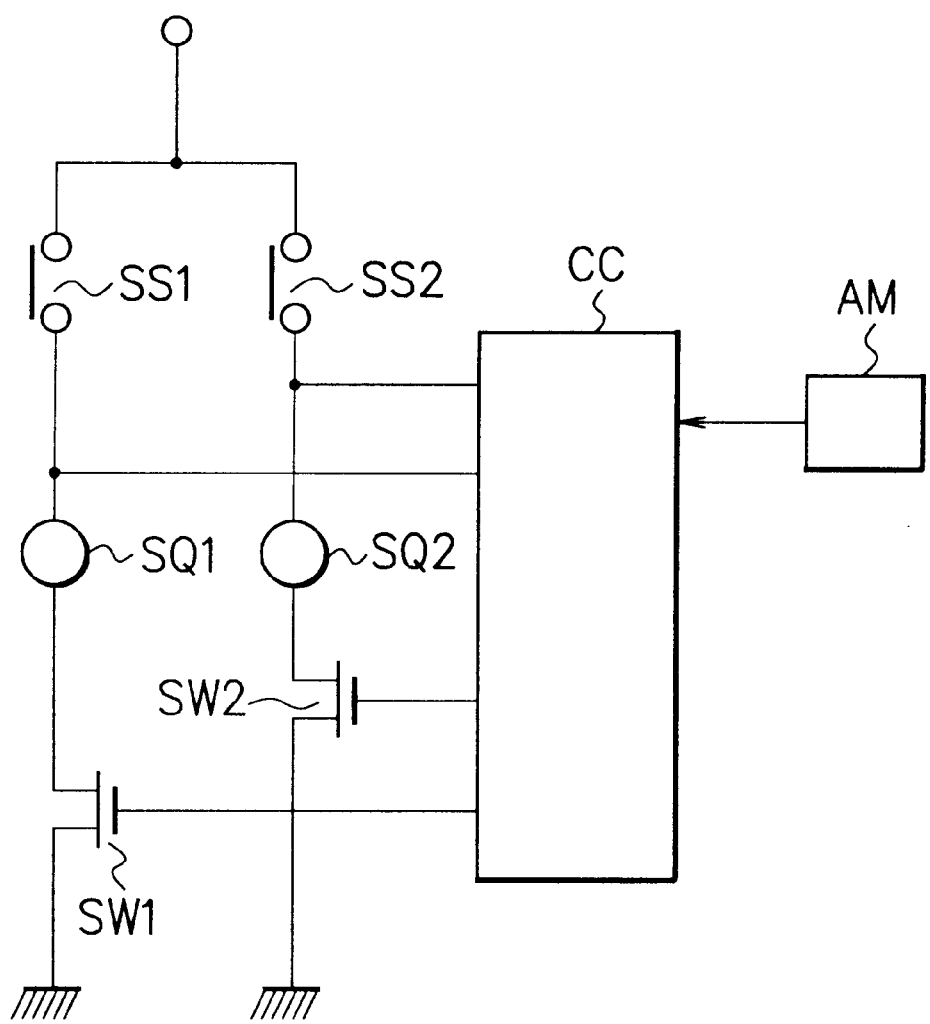
FIG. 1 is a circuit diagram showing a conventional circuit employed in air bag systems.
Figure 2A:
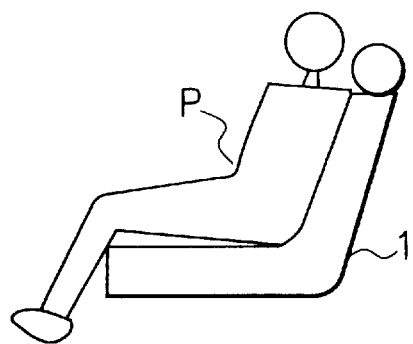
FIG. 2A through FIG. 2C are schematic diagrams showing statuses of a passenger on a passenger seat.
Figure 2B:
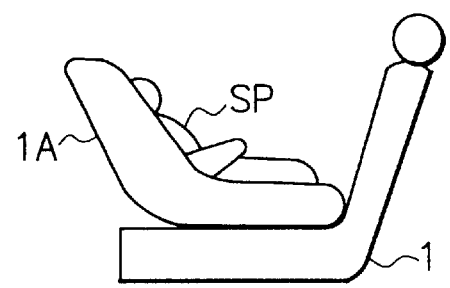
Figure 2C:
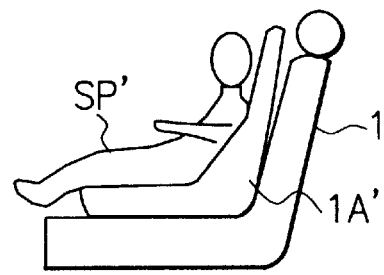
Figure 3:
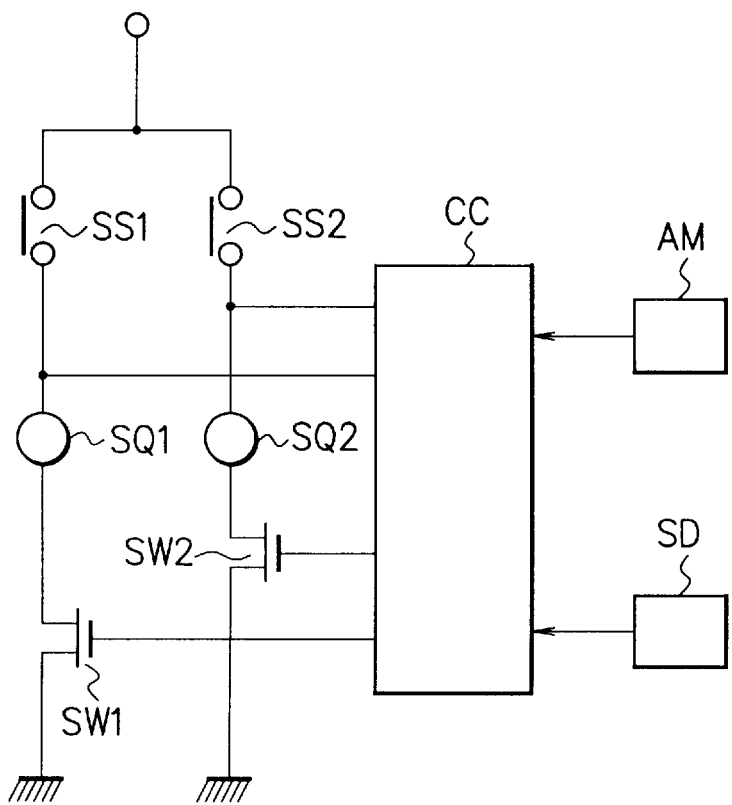
FIG. 3 is a circuit diagram showing another conventional circuit proposed for air bag systems.
Figure 4A:
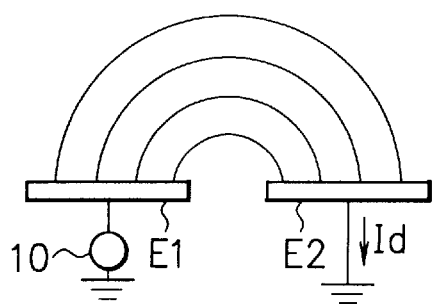
FIG. 4A and FIG. 4B are schematic diagrams showing the principles of a passenger detection system which has lately been proposed by the present inventors.
Figure 4B:
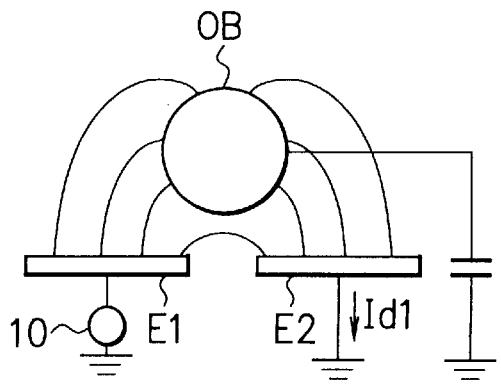
Figure 5:
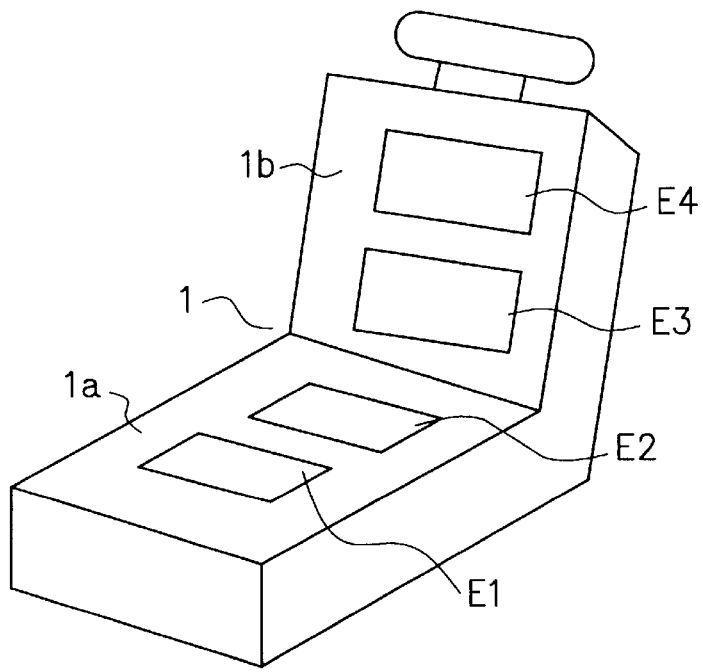
FIG. 5 is a perspective view of a passenger seat which is provided with the passenger detection system which has lately been proposed by the present inventors.
Figure 6:
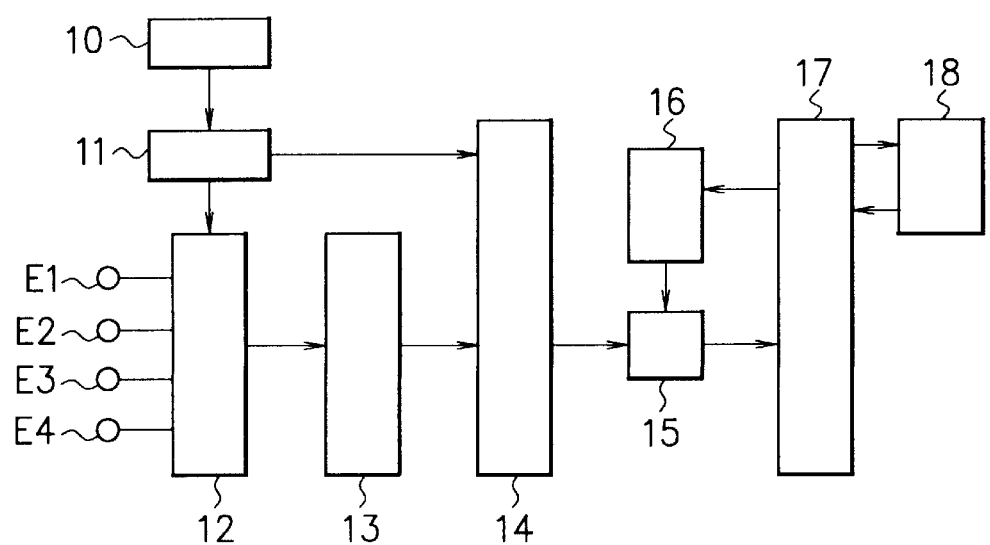
FIG. 6 is a circuit diagram showing the passenger detection system which has lately been proposed by the present inventors.
Figure 7:
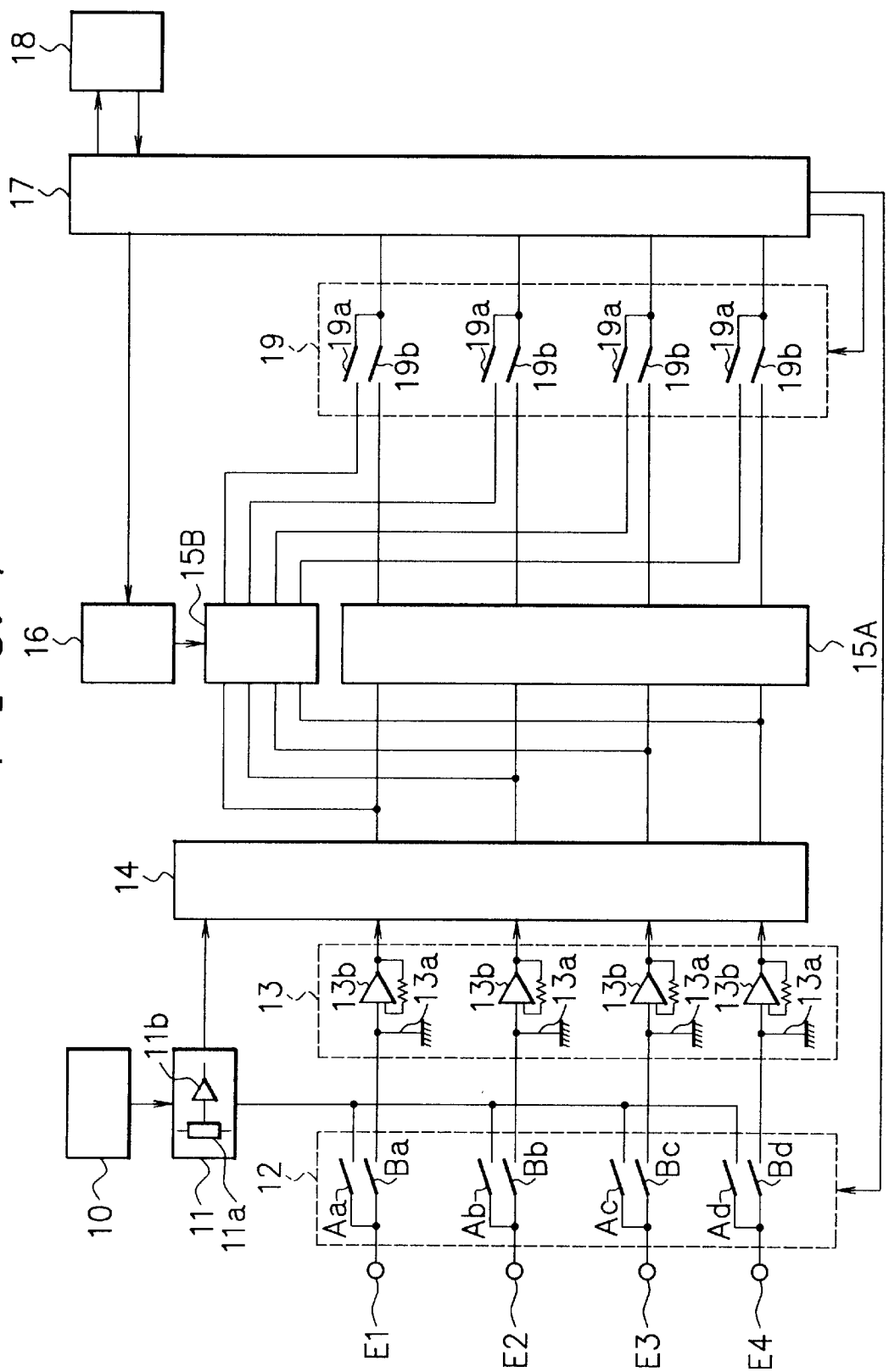
FIG. 7 is a circuit diagram showing more concrete details of FIG. 6.

Referring now to the drawings, a description will be given in detail of preferred embodiments in accordance with the present invention.

The passenger detection system according to the present invention utilizes disturbance in a weak alternating electric field which is generated around an antenna electrode, similarly to the passenger detection system which has been proposed by the present inventors in Japanese Patent Application No.HEI9-42650 and has been shown in FIG. 4A through FIG. 8. Concretely, in the passenger detection system according to the present invention, a weak electric field is generated around an antenna electrode which is placed on a seat, and the presence or absence of a passenger seated on the seat is detected based on a transmission current which passes the antenna electrode and a phase difference between an oscillation signal and an output signal, in which the transmission current and the phase difference varies depending on the electrical characteristic of a substance which is placed around the antenna electrode. Therefore, the passenger detection system of the present invention is a little different from the passenger detection system which has been proposed in Japanese Patent Application No.HEI9-42650 by the present inventors.

Figure 9:
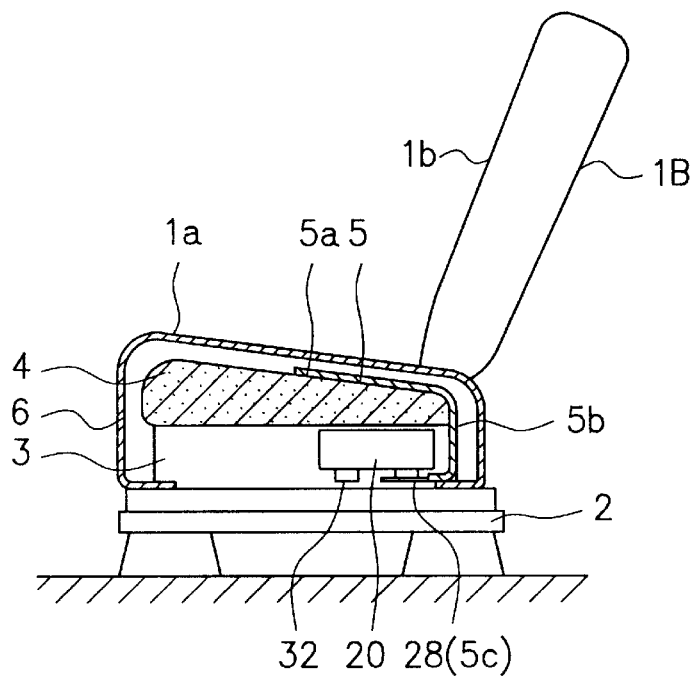
FIG. 9 is a partly sectional fragmentary schematic illustration of a seat which is provided with a passenger detection system according to a first embodiment of the present invention.

FIG. 9 is a partly sectional fragmentary schematic illustration of a seat which is provided with a passenger detection system according to a first embodiment of the present invention. Referring to FIG. 9, the seat 1B is mainly composed of a cushion section 1a and a back section 1b. The cushion section 1a is composed of a seat frame 3 fixed on, for example, a base 2 which is slidable back and forth, a cushion material 4 which is placed on the seat frame 3, an antenna electrode 5 which is placed along the surface of the rear portion of the cushion material 4, and a covering material 6 covering the antenna electrode 5 and the cushion section 1a. A control unit 20 which will be described later is installed in the seat 1B, for example, on the seat frame 3. Incidentally, although the antenna electrode 5 is placed under (i.e. inside) the covering material 6 in FIG. 9, it is also possible to place the antenna electrode 5 on (i.e. outside) the covering material 6. Hereafter, the expression 'The antenna electrode 5 is placed on the upper side of the seat 1B.' means the both placement of the antenna electrode 5 (inside and outside the covering material 6). It is preferable that the antenna electrode 5 is fixed to one or more components of the cushion section 1a, such as the cushion material 4, the covering material 6, etc.

The antenna electrode 5 is formed of electrically conductive fabric in consideration of comfort of the passenger. However the antenna electrode 5 can also be formed by weaving stringy metal in fabric which covers the seat, by applying electrically conductive paint on fabric which covers the seat, etc., or it is also possible to form the antenna electrode 5 of a metal plate.

Figure 10A:
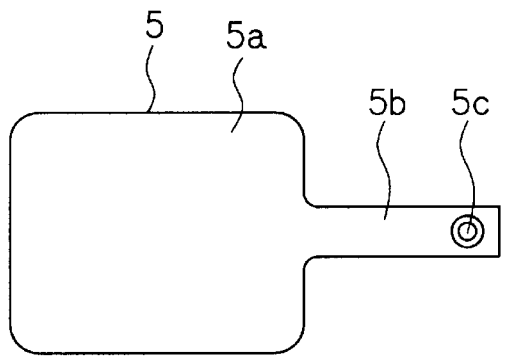
FIG. 10A is a plan view of an antenna electrode which is provided to the cushion section of the seat of FIG. 9.
Figure 10B:
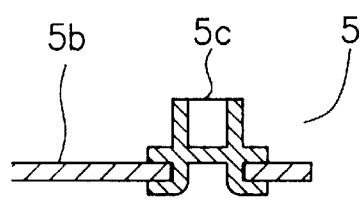
FIG. 10B is a vertical sectional view of a connector which is provided to the end of the antenna electrode of FIG. 10A.

FIG. 10A is a plan view of the antenna electrode 5. Referring to FIG. 10A, the antenna electrode 5 is composed of an antenna section 5a which is placed on the rear portion of the cushion material 4 of the cushion section 1a, a conduction section 5b which is formed by extending the antenna section 5a with an width narrower than the antenna section 5a, and a snap (socket and ball) type connector 5c which is fixed to the end of the conduction section 5b keeping electrical connection with the conduction section 5b as shown in FIG. 10B. The conduction section 5b of the antenna electrode 5 is placed on the rear side of the cushion material 4 so as to reach the seat frame 3, and the connector 5c on the end of the conduction section 5b is connected to a connector 28 of the control unit 20 which will be described later. Incidentally, the connectors 5c and 28 can be formed in other types than the snap (socket and ball) type, such as pin type, plug-jack type, etc.

Figure 11:
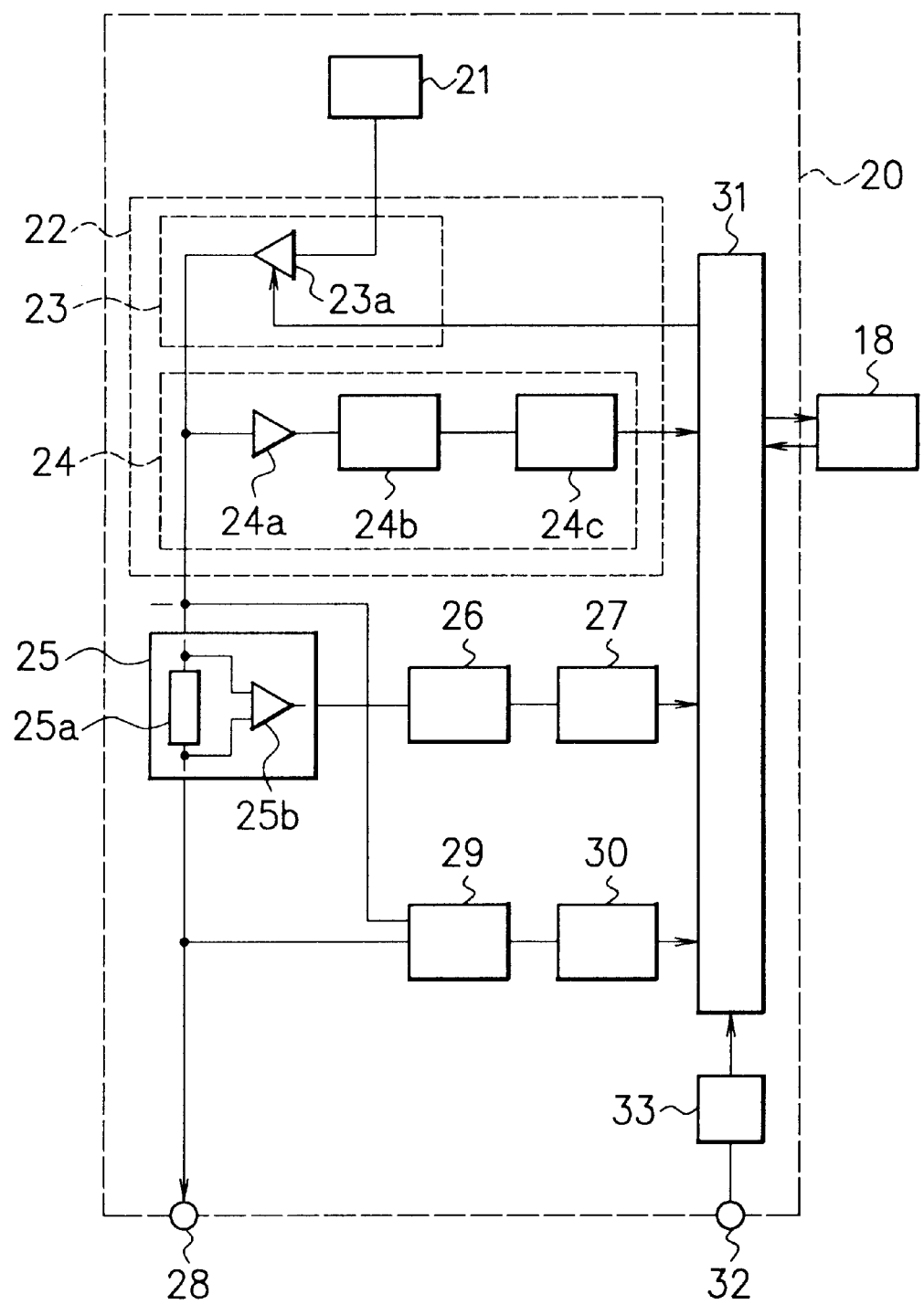
FIG. 11 is a block diagram showing an example of a control unit of the passenger detection system of the first embodiment.

FIG. 11 is a block diagram showing an example of the control unit 20 which is installed in the seat 1B. Referring to FIG. 11, the control unit 20 includes an oscillation circuit 21 for generating high frequency low voltage (for example, 100 KHz and 5~12V) signal, an amplitude control circuit 22 for controlling the voltage amplitude of the signal supplied from the oscillation circuit 21 at an almost constant value, a current detection circuit 25 for detecting a transmission current due to the oscillation signal, an AC-DC conversion circuit 26 for converting the output of the current detection circuit 25 to a DC voltage, an amplifier 27 for amplifying the output of the AC-DC conversion circuit 26, the aforementioned connector 28 which is connected with the current detection circuit 25 and fixed on the housing of the control unit 20, a phase difference detection circuit 29 which is connected to the both ends of the current detection circuit 25 for detecting the phase difference between the oscillation signal from the oscillation circuit 21 and an output signal which is supplied to the antenna electrode 5, an amplifier 30 for amplifying the output of the phase difference detection circuit 29, a control circuit 31 including an MPU (MicroProcessor Unit) etc., a connector 32 which is fixed on the housing of the control unit 20 for being connected to an unshown car battery, and a power circuit 33 which is connected to the connector 32 for generating a uniform DC power voltage (5V, for example) from the power derived from the car battery. The control circuit 31 of the control unit 20 is connected to an air bag unit 18, for example. The single uniform DC power voltage generated by the power circuit 33 is utilized as the system power source for the circuits in the control unit 20 such as the control circuit 31.

The amplitude control circuit 22 includes, for example, an amplitude variation circuit 23 for varying and controlling the voltage amplitude of the oscillation signal and an amplitude detection circuit 24 for detecting the voltage amplitude of the oscillation signal. The amplitude variation circuit 23 includes, for example, an amplitude variation section 23a composed of a programmable gain amplifier (PGA). The amplitude detection circuit 24 includes, for example, an amplitude detection section 24a composed of an operational amplifier etc. for detecting the voltage amplitude of the oscillation signal, an AC-DC conversion circuit 24b for converting the output of the amplitude detection section 24a into a DC voltage, and an amplifier 24c for amplifying the output of the AC-DC conversion circuit 24b. The output of the amplifier 24c of the amplitude detection circuit 24 is supplied to the control circuit 31, and an amplitude control signal is supplied from the control circuit 31 to the amplitude variation section 23a of the amplitude variation circuit 23.

Figure 12:
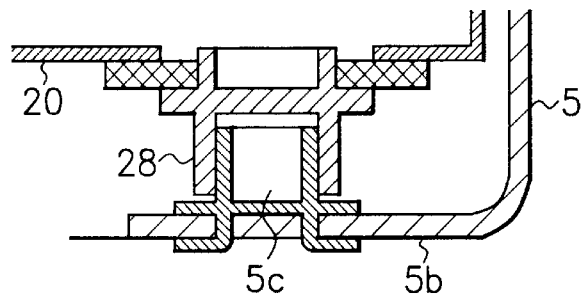
FIG. 12 is a vertical sectional view of a connector on the housing of the control unit of FIG. 11 and the connector of the antenna electrode of FIG. 10B which are coupled together.

The current detection circuit 25 includes, for example, an impedance device such as a resistor 25a which is inserted in series to the signal transmission circuit and an amplifier 25b for amplifying the terminal voltage of the resistor 25a. The output of the current detection circuit 25 is supplied to the control circuit 31 via the AC-DC conversion circuit 26 and the amplifier 27. The output end of the resistor 25a is connected to the connector 28 which is fixed on the housing of the control unit 20. FIG. 12 is a vertical sectional view of the connector 28 on the housing of the control unit 20 and the connector 5c of the antenna electrode 5 which are coupled together.

Figure 13A:
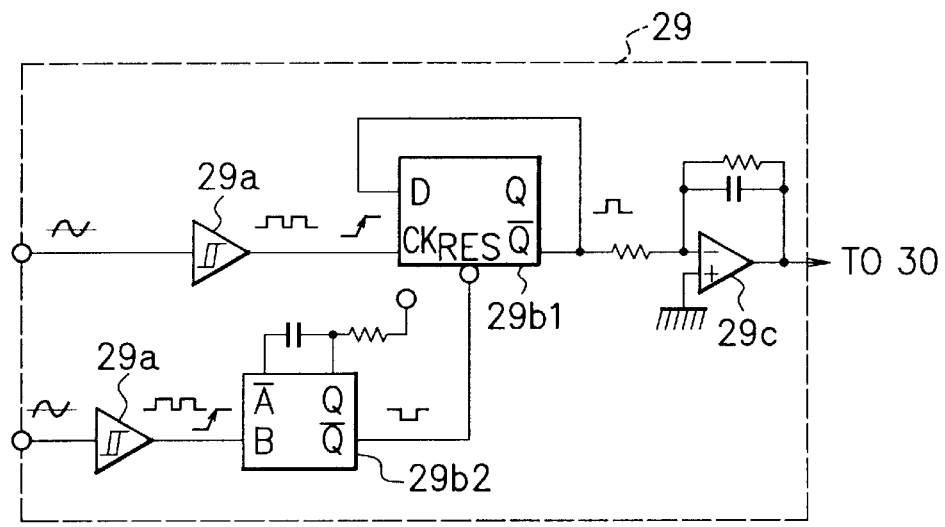
FIG. 13A is a circuit diagram showing an example of a phase difference detection circuit employed in the control unit of FIG. 11.
Figure 13B:
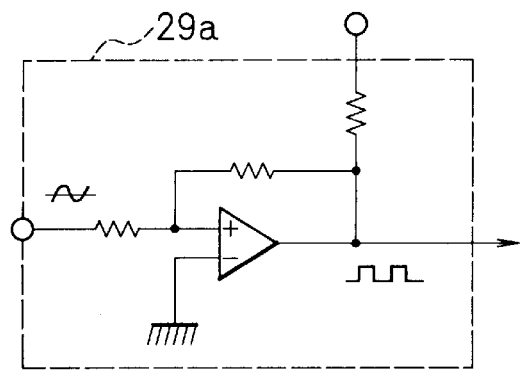
FIG. 13B is a circuit diagram showing an example of composition of a waveform shaping circuit employed in the phase difference detection circuit of FIG. 13A.

FIG. 13A is a circuit diagram showing an example of the phase difference detection circuit 29. Referring to FIG. 13A, the phase difference detection circuit 29 includes waveform shaping circuits 29a, a first flip-flop circuit 29b1, a second flip-flop circuit 29b2, and an integrator circuit 29c. FIG. 13B is a circuit diagram showing an example of composition of the waveform shaping circuit 29a. The waveform shaping circuit 29a transforms the waveform of an input signal (sign wave) into a square wave. The first flip-flop circuit 29b1 is supplied with the oscillation signal from the oscillation circuit 21 which has been transformed into a square wave by the waveform shaping circuit 29a, and the second flip-flop circuit 29b2 is supplied with the output signal to the antenna electrode 5 which has been transformed into a square wave by the waveform shaping circuit 29a.

In the following, the operation of the passenger detection system of FIG. 9 through FIG. 13B will be described.

First, a high frequency low voltage signal is generated by the oscillation circuit 21. The voltage amplitude of the signal is detected by the amplitude detection section 24a of the amplitude detection circuit 24, and the output of the amplitude detection section 24a is converted by the AC-DC conversion circuit 24b into a DC voltage, and the DC voltage is amplified by the amplifier 24c, and the amplified signal is supplied to the control circuit 31. The control circuit 31 judges whether the detected voltage amplitude is larger than the predetermined amplitude or smaller than the predetermined amplitude or equal to a predetermined amplitude, and outputs the amplitude control signal to the amplitude variation section 23a in order to modify the voltage amplitude to be equal to the predetermined amplitude. By the operation of the amplitude detection circuit 24 and the control circuit 31 and the amplitude variation circuit 23, the voltage amplitude of the oscillation signal is controlled to be equal to the predetermined fixed amplitude.

The oscillation signal whose voltage amplitude has been regulated to a fixed value is supplied to the antenna electrode 5 via the current detection circuit 25 and the connector 28, thereby a weak alternating electric field is generated around the antenna electrode 5. The amount of the transmission current which passes between the oscillation circuit 21 to the antenna electrode 5 varies depending on the presence or absence of a passenger seated on the seat 1B. The transmission current is detected by the current detection circuit 25, and the output of the current detection circuit 25 is converted by the AC-DC conversion circuit 26 into a DC voltage, and the DC voltage is amplified by the amplifier 27, and the amplified signal is supplied to the control circuit 31.

Meanwhile, signals (voltages) at both ends of the current detection circuit 25 (i.e. the oscillation signal on the side of the amplitude control circuit 22 supplied from the oscillation circuit 21 and the output signal on the side of the connector 28 which is supplied to the antenna electrode 5) are supplied to the phase difference detection circuit 29. The oscillation signal and the output signal which are in shapes of sign waves are transformed by the waveform shaping circuits 29a into square waves (hereafter, referred to as a square wave oscillation signal and a square wave output signal), and are supplied to the first flip-flop circuit 29b1 and the second flip-flop circuit 29b2 respectively. FIG. 14A through FIG. 14C are timing charts showing the operation of the phase difference detection circuit 29. When the square wave oscillation signal is supplied to the first flip-flop circuit 29b1, a rising edge of the square wave oscillation signal (indicated with an arrow) is detected by the clock terminal CK of the first flip-flop circuit 29b1 and the terminal Q-bar of the first flip-flop circuit 29b1 is turned into High as shown in FIG. 14A. On the other hand, the square wave output signal is supplied to the second flip-flop circuit 29b2 and rising edges of the square wave output signal are detected by the terminal B of the second flip-flop circuit 29b2. On every detection of the rising edge at the terminal B, the second flip-flop circuit 29b2 outputs a short Low signal from its terminal Q-bar as shown in FIG. 14B. The short Low signal is inputted to the reset terminal RES of the first flip-flop circuit 29b1, thereby the terminal Q-bar of the first flip-flop circuit 29b1 is reset into Low as shown in FIG. 14C. The (High) output of the terminal Q-bar of the first flip-flop circuit 29b1, representing the phase difference between the oscillation signal and the output signal, is converted into a voltage by the integrator circuit 29c, and the voltage is amplified by the amplifier 30, and the amplified voltage is supplied to the control circuit 31.

Figure 15:
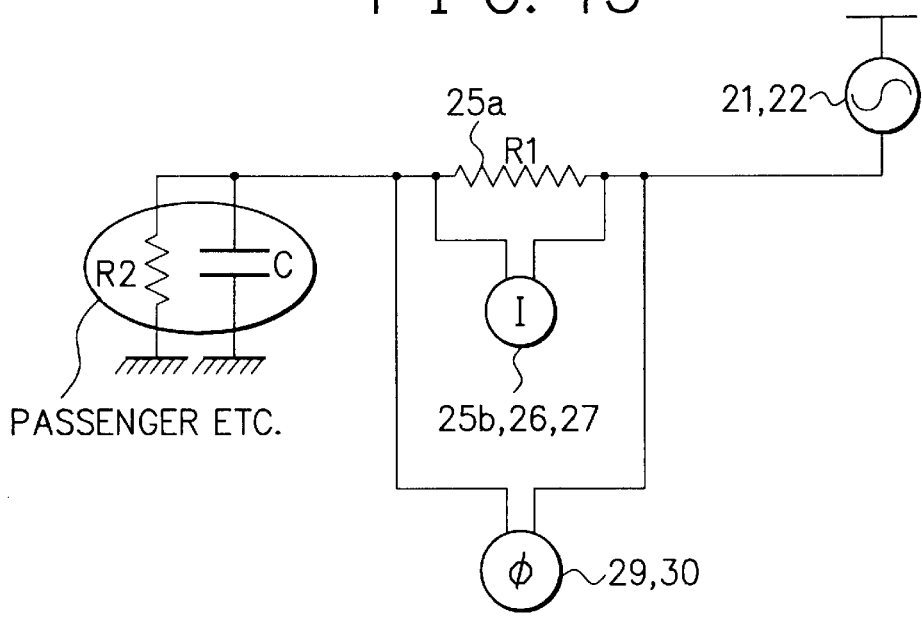
FIG. 15 is a circuit diagram explaining the principle behind the passenger detection system according to the present invention.
Figure 16A:
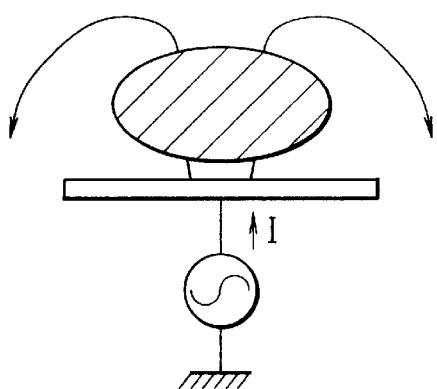
FIG. 16A and FIG. 16B are schematic diagrams explaining characteristics of a transmission current which passes between an oscillation circuit and an antenna electrode of the passenger detection system.
Figure 16B:
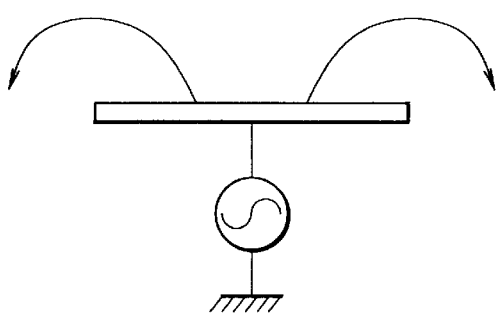
Figure 17:
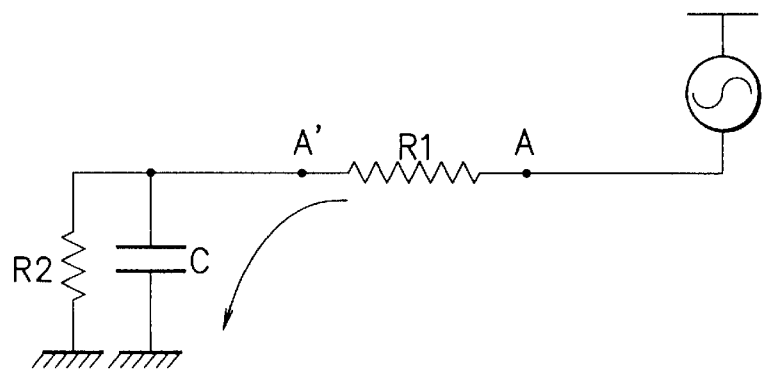
FIG. 17 is a schematic diagram explaining the phase difference between a transmission signal supplied from the oscillation circuit and an output signal supplied to the antenna electrode.

FIG. 15 is a circuit diagram explaining the principle behind the passenger detection system according to the present invention. The transmission current is detected by the current detection circuit 25 including the resistor 25a whose resistance is R1, and the phase difference is detected by the phase difference detection circuit 29 which is connected to both ends of the resistor 25a of the current detection circuit 25. As shown in FIG. 15, a passenger (, articles, air, etc.) can be represented by a resistance R2 and a capacitance C which connect the antenna electrode 5 and the ground. FIG. 16A and FIG. 16B are schematic diagrams explaining characteristics of the transmission current. When a passenger is seated on the seat 1B as shown in FIG. 16A, the transmission current becomes larger than the case of FIG. 16B with no passenger, since permittivity of the passenger is larger than that of air. FIG. 17 is a schematic diagram explaining the phase difference. As mentioned above, the passenger can be represented by a resistance R2 and a capacitance C which connect the antenna electrode 5 and the ground. The resistance RI of the resistor 25a and the capacitance C functions like a filter as shown in FIG. 17, and thus a phase difference occurs between the points A and A' on the ends of the resistance R1. Therefore, the phase difference with a passenger seated on the seat 1B becomes larger than that with nothing placed on the seat.

In the control circuit 31, a first threshold value concerning the transmission current which is detected by the current detection circuit 25 and a second threshold value concerning the phase difference (between the oscillation signal supplied to the current detection circuit 25 and the output signal supplied to the antenna electrode 5) are prestored.

According to the above-mentioned principle, the transmission current detected by the current detection circuit 25 takes on larger values in the case where a passenger is seated on the seat 1B, and takes on smaller values in the case where articles other than a passenger is placed on the seat 1B or nothing is placed on the seat 1B. There exists obvious difference between the groups of values in the above two cases. The phase difference detected by the phase difference detection circuit 29 also takes on larger values in the case where a passenger is seated on the seat 1B, and takes on smaller values in the case where articles other than a passenger is placed on the seat 1B or nothing is placed on the seat 1B. There exists obvious difference between the groups of values in the above two cases.

Therefore, the first threshold value concerning the transmission current is set at a desired value between a larger mean value of the transmission current with a passenger seated on the seat 1B and a smaller mean value of the transmission current with articles other than a passenger placed on the seat 1B or with nothing placed on the seat 1B. Similarly, the second threshold value concerning the phase difference is set at a desired value between a larger mean value of the phase difference with a passenger seated on the seat 1B and a smaller mean value of the phase difference with articles other than a passenger placed on the seat 1B or with nothing placed on the seat 1B.

Both threshold values concerning the transmission current and the phase difference are used for precise judgment of seating status on the seat 1B. For example, it is first judged that a passenger is probably seated on the seat 1B if the transmission current detected by the current detection circuit 25 is larger than or equal to the first threshold value concerning the transmission current, and then it is judged that a passenger is actually seated on the seat 1B if the phase difference detected by the phase difference detection circuit 29 is also larger than or equal to the first threshold value concerning the phase difference.

Incidentally, it is also possible to set a plurality of threshold values such as the upper limit, the lower limit, etc. as each of the first threshold value concerning the transmission current and the second threshold value concerning the phase difference, in consideration of situations (wet with water, etc.) of the seat 1B. Or a plurality of threshold values for dividing the seating status on the seat 1B into 'vacant seat level', 'baggage level', 'passenger level', etc. can be set as each of the first threshold value concerning the transmission current and the second threshold value concerning the phase difference.

Figure 8:
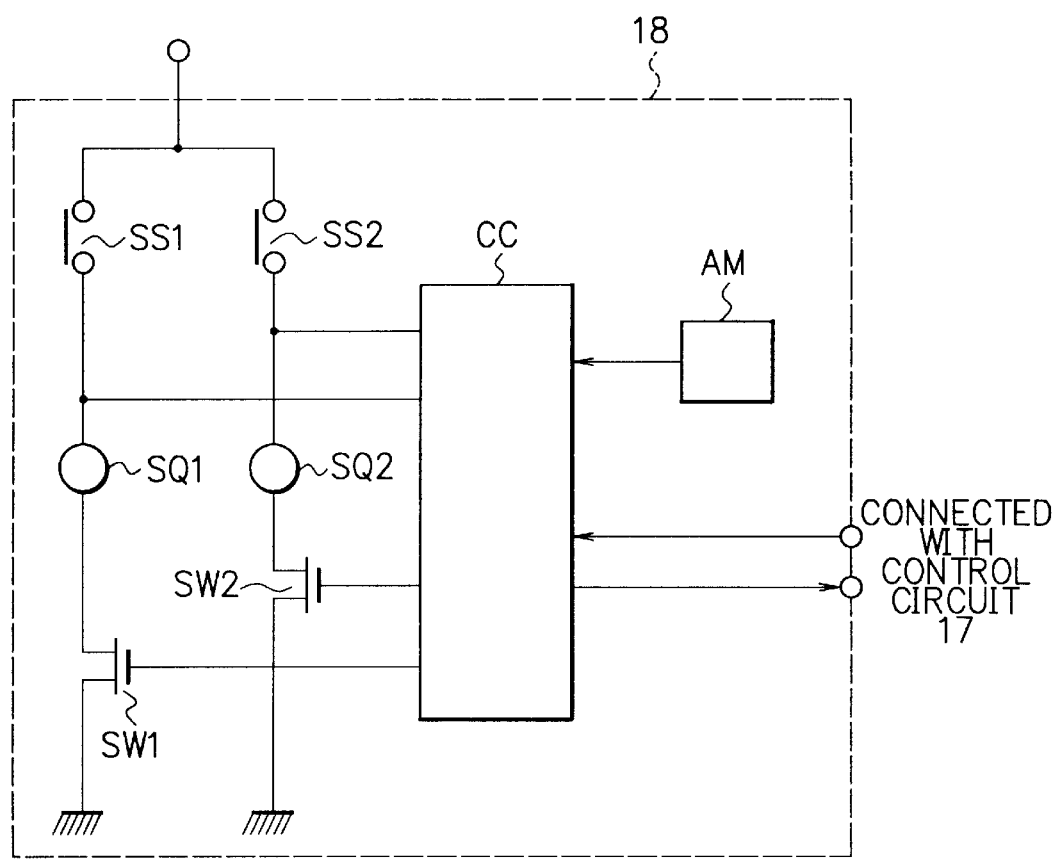
FIG. 8 is a circuit diagram showing an example of a circuit which is employed in an air bag unit which is connected with the passenger detection system of FIG. 6 and FIG. 7.

After the presence or absence of the passenger on the seat 1B is judged by the control circuit 31, a signal according to the judgment is transmitted by the control circuit 31 to the air bag unit 18 which has been shown in FIG. 8. Incidentally, the 'CONNECTED WITH CONTROL CIRCUIT 17' in FIG. 8 should be read as 'CONNECTED WITH CONTROL CIRCUIT 31' in this embodiment. A signal instructing the air bag unit 18 to set itself at the no deployment mode (in which the air bag unit 18 does not deploy the air bag for the passenger seat 1B on collision) is transmitted by the control circuit 17 in the case where it has been judged that no passenger is seated on the passenger seat 1B. For example, when a plurality of threshold values are used as mentioned above, the signal instructing to set at the no deployment mode is transmitted in the case where the determined seating status on the passenger seat 1B is in the vacant seat level or the baggage level. On the other hand, a signal instructing the air bag unit 18 to set itself at the deployment mode (in which the air bag unit 18 deploys the air bag for the passenger seat 1B on collision) is transmitted by the control circuit 31 in the case where it has been judged that a passenger is seated on the passenger seat 1B.

These signals are received by the control circuit CC of the air bag unit 18, and in the former case, the control circuit CC is set not to supply a gate signal to the semiconductor switching device SW2 on the side of the passenger seat 1B on collision. The semiconductor switching device SW1 on the side of the driver's seat is necessarily supplied with a gate signal on collision. In the latter case, the control circuit CC is set to supply gate signals to the semiconductor switching devices SW1 and SW2 on collision.

In the following, an example of a process in which the passenger detection system of the first embodiment is operated in a car will be explained referring to FIG. 18 through FIG. 21. In this explanation, a process employing one threshold value concerning the transmission current and one threshold value concerning the phase difference will be described for brevity.

Figure 18:
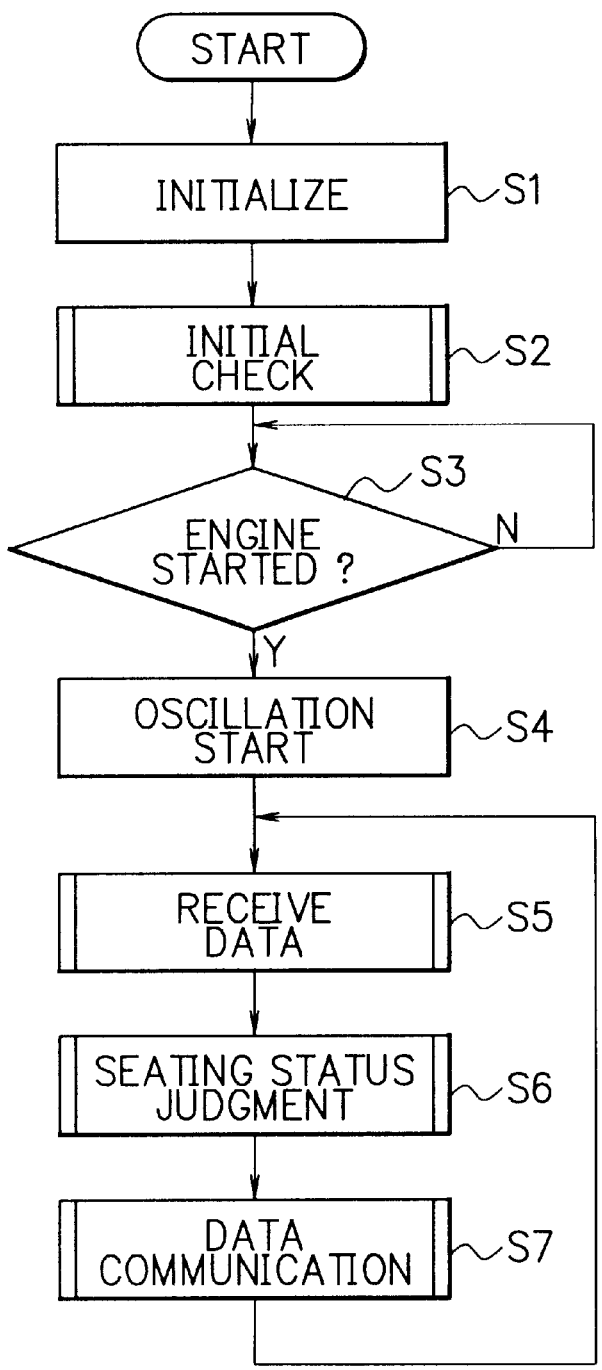
FIG. 18 is a flow chart showing an example of a process in which the passenger detection system of the first embodiment is operated in a car.

Referring to FIG. 18, the process is started when the ignition switch of the car is turned ON. The air bag system is initialized in step S1. In step S2, the initial check of the communication system between the control circuit 31 and the air bag unit 18 is executed. In step S3, it is judged whether or not the engine of the car has already been started. The process proceeds to step S4 if the engine has already been started, and if else, the step S3 is repeated. In the step S4, oscillation by the oscillation circuit 21 is started and thereby a weak alternating electric field is generated around the antenna electrode 5. In step S5, data concerning the transmission current detected by the current detection circuit 25 and data concerning the phase difference detected by the phase difference detection circuit 29 is received by the control circuit 31. In step S6, judgment of the seating status on the seat 1B is executed based on the data by the control circuit 31. In step S7, data communication according to the judgment result is executed between the control circuit 31 and the air bag unit 18. Thereafter, the process between the step S5 and the step S7 is repeated. Incidentally, it is also possible to omit the step S3.

Figure 19:
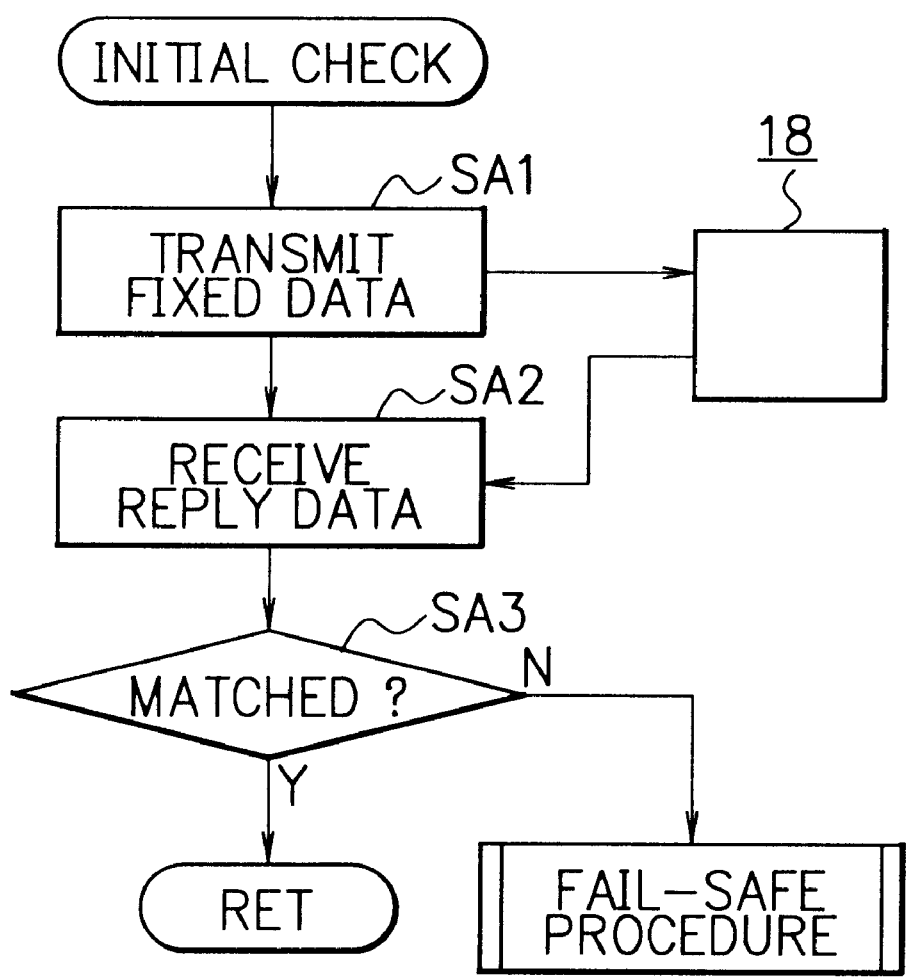
FIG. 19 is a flow chart showing an example of an initial check step in FIG. 18.

FIG. 19 is a flow chart showing an example of the initial check of the step S2 of FIG. 18. In step SA1, a fixed data is transmitted by the control circuit 31 to the control circuit CC of the air bag unit 18. In step SA2, a reply data transmitted by the control circuit CC of the air bag unit 18 is received by the control circuit 31. In step SA3, the control circuit 31 judges whether or not the reply data transmitted by the control circuit CC matches the fixed data transmitted to the control circuit CC. If matched, the initial check is finished and the process proceeds to the following steps of FIG. 18. If not matched, it is judged that failure exists in the communication system between the control circuit 31 and the air bag unit 18, and a fail-safe procedure such as illumination of a warning lamp is performed. Incidentally, although the initial check was executed in the above example by the control circuit 31 by transmitting the fixed data to the control circuit CC of the air bag unit 18 and receiving the reply data from the control circuit CC, it is also possible to let the control circuit CC of the air bag unit 18 execute the initial check by transmitting a fixed data to the control circuit 31 and receiving a reply data from the control circuit 31.

Figure 20:
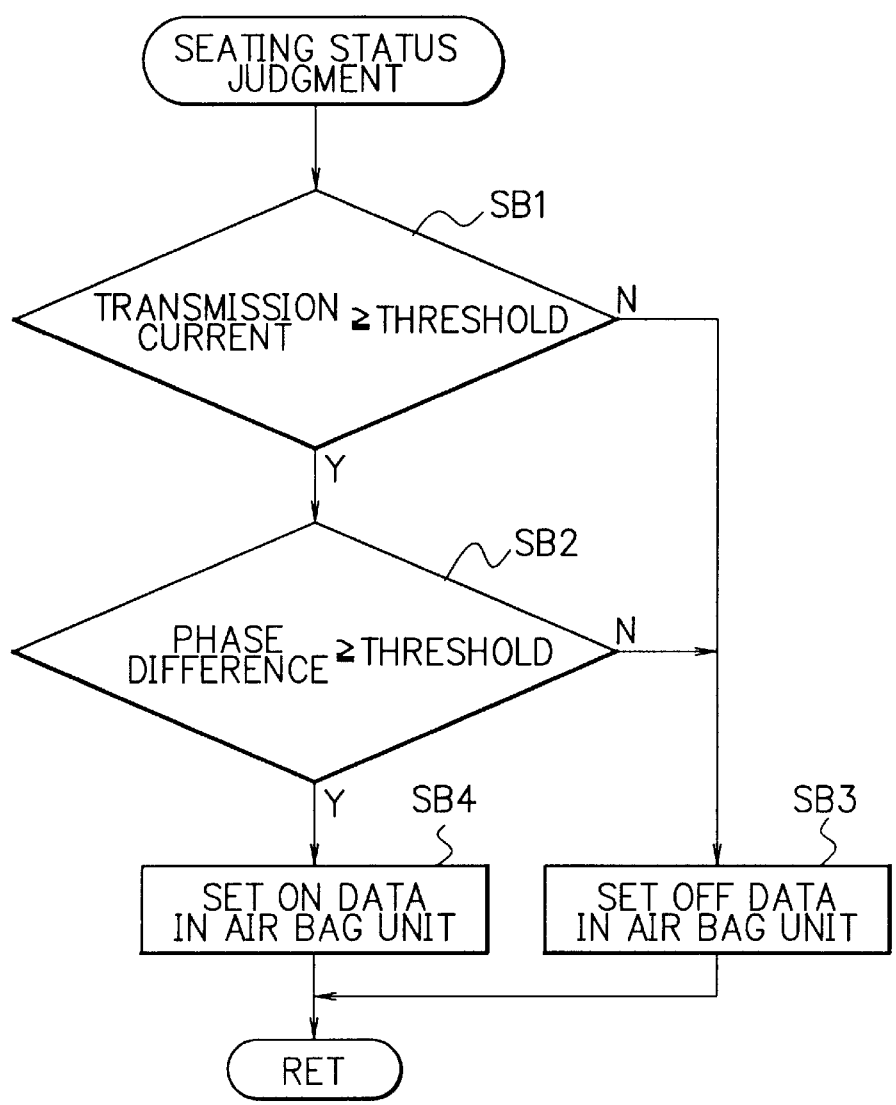
FIG. 20 is a flow chart showing an example of a seating status judgment step in FIG. 18.

FIG. 20 is a flow chart showing an example of the seating status judgment of the step S6 of FIG. 18. In step SB1, it is judged whether or not the data concerning the transmission current detected by the current detection circuit 25 is larger than or equal to the first threshold value which is prestored in the control circuit 31. If the transmission current data is larger than or equal to the first threshold value (i.e. if a passenger is probably seated on the seat 1B), process proceeds to step SB2. If the transmission current data is smaller than the first threshold value, process proceeds to step SB3, and OFF data for setting the air bag unit 18 at the no deployment mode is set in the control circuit CC of the air bag unit 18, and the process proceeds to the step S7 (data communication) of FIG. 18. In the step SB2, it is judged whether or not the data concerning the phase difference detected by the phase difference detection circuit 29 is larger than or equal to the second threshold value which is prestored in the control circuit 31. If the phase difference data is larger than or equal to the second threshold value (i.e. if a passenger is seated on the seat 1B), process proceeds to step SB4. If the phase difference data is smaller than the second threshold value, process proceeds to the step SB3. In the step SB4, ON data for setting the air bag unit 18 at the deployment mode is set in the control circuit CC of the air bag unit 18, and the process proceeds to the step S7 (data communication) of FIG. 18.

Figure 21:
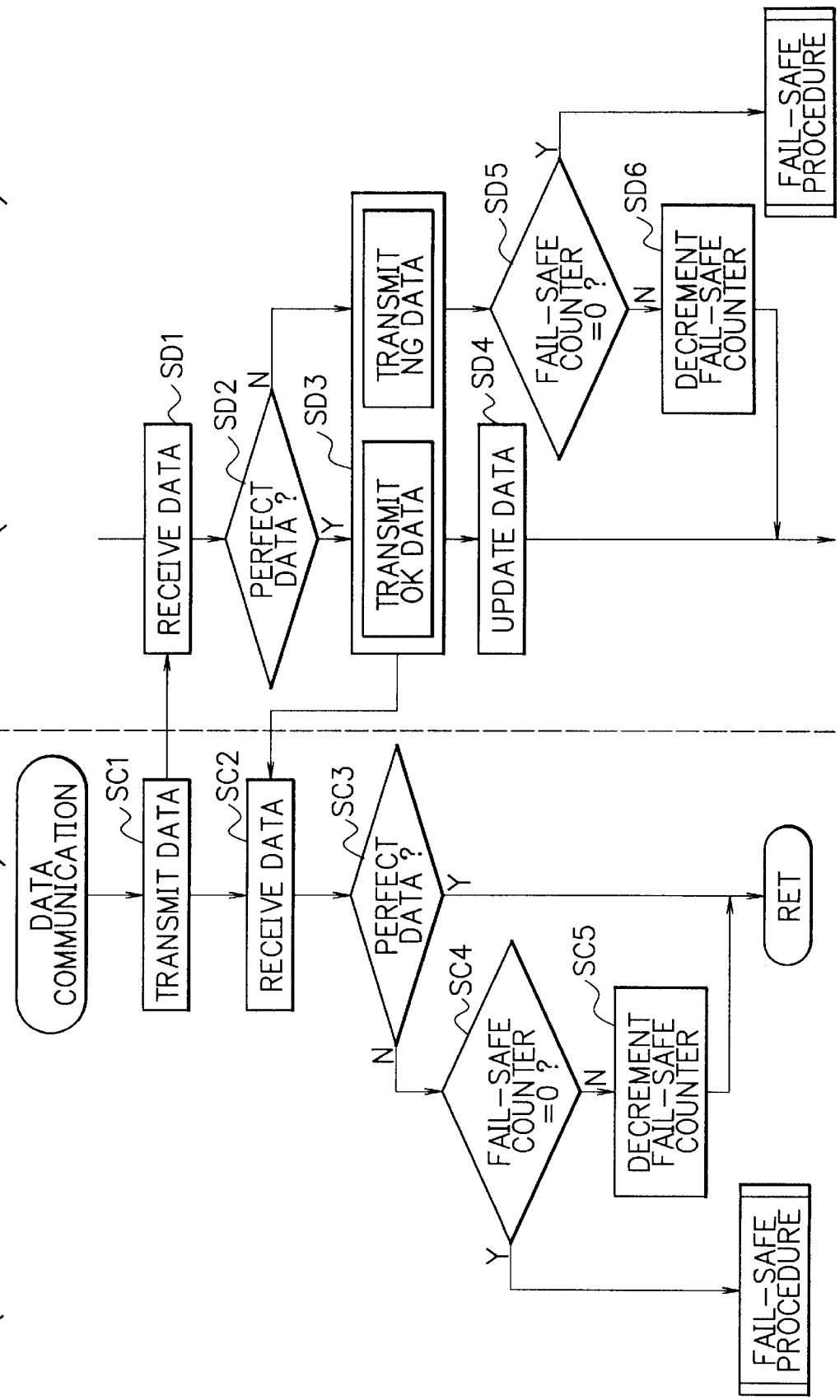
FIG. 21 is a flow chart showing an example of a data communication step in FIG. 18.

FIG. 21 is a flow chart showing an example of the data communication of the step S7 of FIG. 18. First, steps in the data communication executed by the control circuit 31 of the control unit 20 of the passenger detection system will be described. In step SCi, the ON data or the OFF data for setting the air bag unit 18 at the deployment mode or the no deployment mode and a check data are transmitted by the control circuit 31 of the passenger detection system to the control circuit CC of the air bag unit 18. In step SC2, an OK data or an NG data for responding to the ON data or the OFF data and the check data which have been transmitted by the control circuit CC are received by the control circuit 31. In step SC3, it is checked whether or not the ON/OFF data and the check data which have been transmitted by the control circuit 31 to the control circuit CC could be sent back to the control circuit 31 by the control circuit CC in perfect form. If the data sent back to the control circuit 31 were in perfect form (i.e. if the communication system between the control unit 20 and the air bag unit 18 has no failure), the data communication of the step S7 of FIG. 18 is ended and the process is returned to the step S5 of FIG. 18. If the data sent back to the control circuit 31 were not in perfect form (i.e. if the communication system between the control unit 20 and the air bag unit 18 has failure), process proceeds to step SC4 and it is judged whether or not a fail-safe counter of the control circuit 31 has come to zero. The initial value of the fail-safe counter of the control circuit 31 is set at 3, for example. Therefore, fail-safe procedure such as illumination of a warning lamp is performed when the failure of the communication system is detected three times (i.e. when the fail-safe counter comes to zero). If the fail-safe counter has not come to zero in the step SC4, process proceeds to step SC5 and the fail-safe counter is decremented, and the data communication of the step S7 of FIG. 18 is ended and the process is returned to the step S5 of FIG. 18.

Next, steps in the data communication executed by the control circuit CC of the air bag unit 18 will be described. In step SD1, the ON data or the OFF data for setting the air bag unit 18 at the deployment mode or the no deployment mode and the check data which have been transmitted by the control circuit 31 is received by the control circuit CC. In step SD2, the control circuit CC judges whether or not the ON/OFF data and the check data could be received in perfect form (i.e. whether or not the communication system between the control circuit 31 and the control circuit CC has no failure). If the communication system is judged to have no failure in the step SD2, the OK data and the check data are transmitted by the control circuit CC to the control circuit 31 in step SD3 and process proceeds to step SD4. In the step SD4, data in the control circuit CC of the air bag unit 18 is updated according to the ON/OFF data, and the air bag unit 18 is set at the deployment mode or the no deployment mode. If the communication system is judged to have failure in the step SD2, the NG data and the check data are transmitted by the control circuit CC to the control circuit 31 in the step SD3 and process proceeds to step SD5. In the step SD5, it is judged whether or not a fail-safe counter of the control circuit CC has come to zero. The initial value of the fail-safe counter of the control circuit CC is set at 3, for example. Therefore, fail-safe procedure such as illumination of a warning lamp is performed when the failure of the communication system is detected three times (i.e. when the fail-safe counter comes to zero). If the fail-safe counter has not come to zero in the step SD5, process proceeds to step SD6 and the fail-safe counter is decremented, and the data communication of the step S7 of FIG. 18 is ended and the process is returned to the step S5 of FIG. 18.

As described above, according to the first embodiment, a weak alternating electric field is generated around an antenna electrode 5 which is placed on the upper side of a seat 1B by a high frequency low voltage signal supplied from an oscillation circuit 21, and a transmission current which passes between the oscillation circuit 21 and the antenna electrode 5 is detected by a current detection circuit 25 etc. The amount of the transmission current varies depending on what is placed on the seat 1B, and the transmission current becomes especially large when a passenger is seated on the seat. There exists obvious difference of the amount of the transmission current between the case where a passenger is seated on the seat 1B and other cases. Therefore, the presence or absence of a passenger seated on the seat 1B can be detected by the detection of the transmission current by the current detection circuit 25.

Further, a phase difference between an oscillation signal which is supplied from the oscillation circuit 21 and an output signal which is supplied to the antenna electrode 5 is detected by a phase difference detection circuit 29 etc. The amount of the phase difference varies depending on what is placed on the seat 1B, and the phase difference becomes especially large when a passenger is seated on the seat. There exists obvious difference of the amount of the phase difference between the case where a passenger is seated on the seat 1B and other cases. Therefore, the presence or absence of a passenger seated on the seat 1B can be detected more precisely and correctly by further executing the detection of the phase difference by the phase difference detection circuit 29.

Incidentally, it is of course possible to employ either the current detection circuit 25 or the phase difference detection circuit 29 for the detection of the presence or absence of a passenger seated on the seat 1B, instead of employing both detection circuits.

Especially, the passenger detection system needs only one antenna electrode 5, therefore circuit composition of the system can be simplified compared to the passenger detection system needing a plurality of electrodes which have been proposed by the present inventors, and thus cost for the system can be reduced.

Further, the single uniform DC power voltage generated by the power circuit 33 is utilized as the system power source for the circuits in the control unit 20 including the control circuit 31. Therefore, circuit composition of the control unit 20 can be simplified, and thus cost for the system can be further reduced. Incidentally, it is of course possible to use two or more power sources for the operation of the control unit 20 instead of the single uniform DC power voltage generated by the power circuit 33.

Further, the voltage amplitude of the oscillation signal for being supplied to the antenna electrode 5 is previously regulated to a fixed value by the amplitude control circuit 22 and variation of the voltage amplitude of the oscillation signal is avoided. Therefore, the detection of a passenger seated on the seat 1B can be executed with precision and reliability, only by the simple comparison of the transmission current detected by the current detection circuit 25 with the first threshold value concerning the transmission current prestored in the control circuit 31.

The control circuit 31 judges the presence or absence of a passenger seated on the seat 1B, and the air bag unit 18 is set at the deployment mode (in which the air bag unit 18 deploys the air bag for the passenger seat 1B on collision) if it has been judged that a passenger is seated on the passenger seat 1B, and the air bag unit 18 is set at the no deployment mode (in which the air bag unit 18 does not deploy the air bag for the passenger seat 1B on collision) if it has been judged that nothing is placed on the passenger seat 1B or baggage etc. is placed on the passenger seat 1B. Therefore, even when a collision occurred, unnecessary and undesirable deployment of the air bag for the passenger seat on which no passenger is seated can be avoided.

Further, in the antenna electrode 5, a conduction section 5b is formed by extending the antenna section 5a with an width narrower than the antenna section 5a, and a connector 5c on the end of the conduction section 5b is connected to a connector 28 of the control unit 20 which is installed on the seat 1B, and thus there is no need to provide a wire harness in order to connect the antenna section 5a and the control unit 20. Therefore, along with the simplification of the circuit by means of the single uniform DC power voltage for the system power source and the single antenna electrode 5, cost for the system can be further reduced. Incidentally, it is of course possible to connect the antenna section 5a and the control unit 20 by a wire harness etc. instead of the conduction section 5b.

Figure 22:
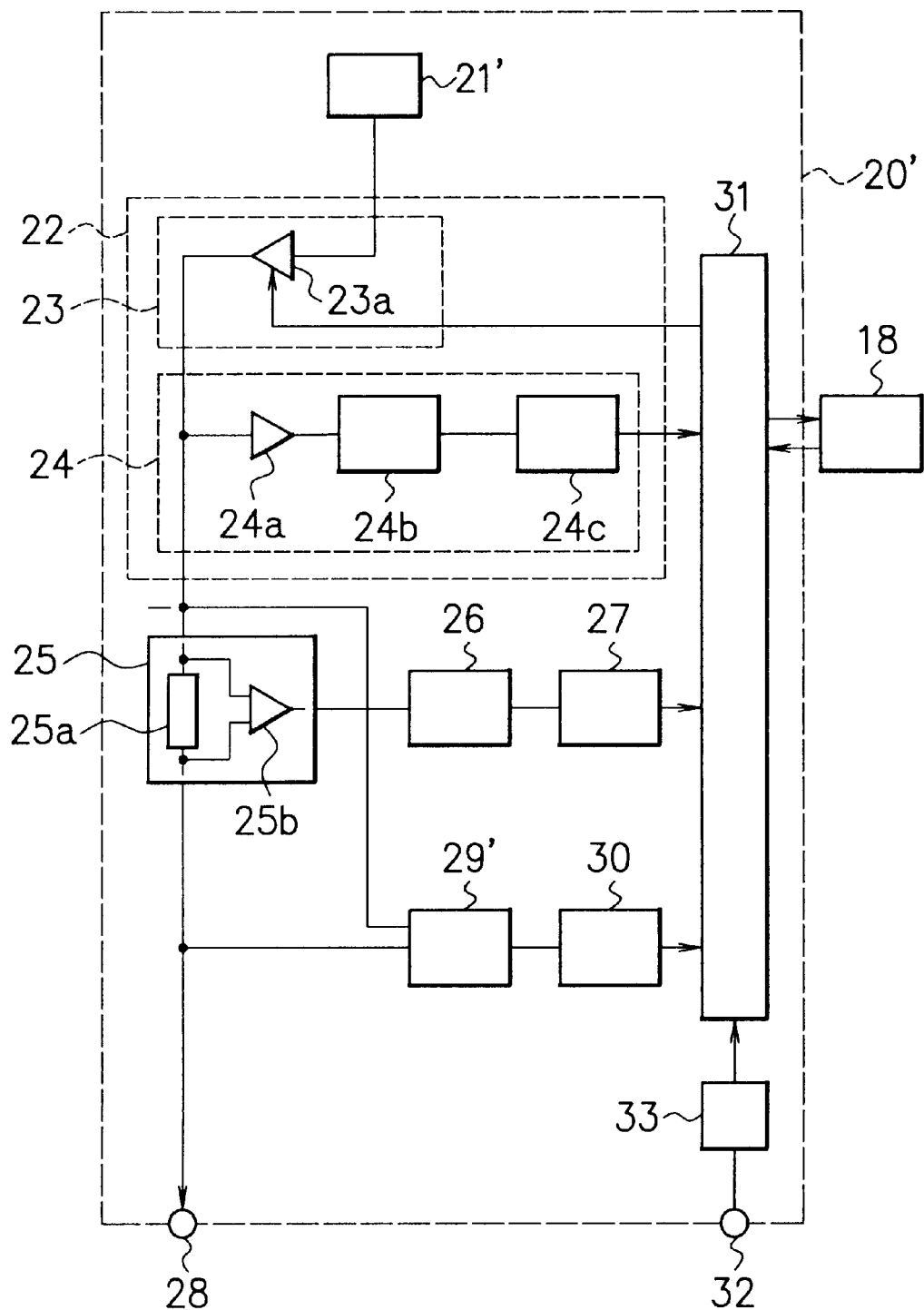
FIG. 22 is a block diagram showing a control unit of a passenger detection system according to a second embodiment of the present invention.

FIG. 22 is a block diagram showing a control unit 20' of a passenger detection system according to a second embodiment of the present invention. The control unit 20' shown in FIG. 22 has almost the same composition as the control unit 20 of FIG. 11, except for the oscillation circuit 21' and the phase difference detection circuit 29'. The oscillation circuit 21' generates a high frequency low voltage (for example, 100 KHz and 5~12 V) square wave signal utilizing the single uniform DC power voltage generated by the power circuit 33.

Figure 23:
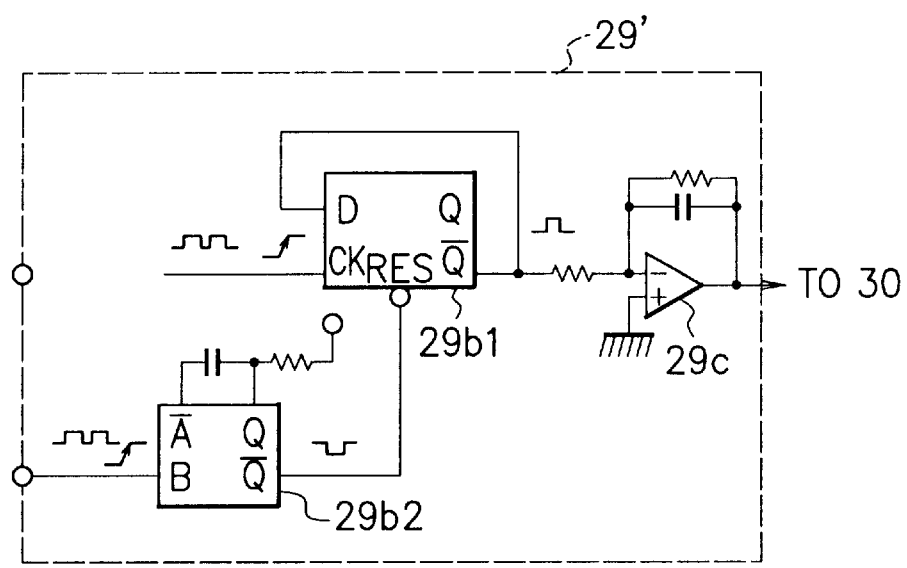
FIG. 23 is a circuit diagram showing an example of a phase difference detection circuit of the second embodiment.

FIG. 23 is a circuit diagram showing an example of the phase difference detection circuit 29' of the second embodiment. Referring to FIG. 23, the phase difference detection circuit 29' includes a first flip-flop circuit 29b1, a second flip-flop circuit 29b2, and an integrator circuit 29c. The first flip-flop circuit 29b1 and the second flip-flop circuit 29b2 are supplied with the oscillation signal from the oscillation circuit 21 and the output signal which is supplied to the antenna electrode 5, respectively. The phase difference detection circuit 29' is not provided with the waveform shaping circuits 29a shown in FIG. 13A and FIG. 13B, since the oscillation signal and the output signal are already square waves.

The phase difference detection circuit 29' of the second embodiment operates as follows. Signals (voltages) at both ends of the current detection circuit 25 (i.e. the oscillation signal on the side of the amplitude control circuit 22 supplied from the oscillation circuit 21' and the output signal on the side of the connector 28 which is supplied to the antenna electrode 5) are supplied to the phase difference detection circuit 29'. The oscillation signal and the output signal which are in shapes of square waves are supplied to the first flip-flop circuit 29b1 and the second flip-flop circuit 29b2 respectively. When the oscillation signal is supplied to the first flip-flop circuit 29b1, a rising edge of the oscillation signal (indicated with an arrow) is detected by the clock terminal CK of the first flip-flop circuit 29b1 and the terminal Q-bar of the first flip-flop circuit 29b1 is turned into High as shown in FIG. 14A. On the other hand, the output signal is supplied to the second flip-flop circuit 29b2 and rising edges of the output signal are detected by the terminal B of the second flip-flop circuit 29b2. On every detection of the rising edge at the terminal B, the second flip-flop circuit 29b2 outputs a short Low signal from its terminal Q-bar as shown in FIG. 14B. The short Low signal is inputted to the reset terminal RES of the first flip-flop circuit 29b1, thereby the terminal Q-bar of the first flip-flop circuit 29b is reset into Low as shown in FIG. 14C. The (High) output of the terminal Q-bar of the first flip-flop circuit 29b1, representing the phase difference between the oscillation signal and the output signal, is converted into a voltage by the integrator circuit 29c, and the voltage is amplified by the amplifier 30 and supplied to the control circuit 31.

The operation of the passenger detection system of the second a embodiment except the oscillation circuit 21' and the phase difference detection circuit 29' is the same as that of the first embodiment, and thus repeated description thereof is omitted for brevity.

As described above, according to the second embodiment, a high frequency low voltage square wave signal is generated by the oscillation circuit 21' utilizing the system power source. Therefore, circuit composition of the control unit 20' can be simplified in comparison with the first embodiment, and thus cost for the system can be further reduced. Incidentally, in many cases, the control circuit 31 including an MPU has a function for outputting a high frequency low voltage square wave signal utilizing a clock signal supplied thereto, and thus the control circuit 31 can be utilized as the oscillation circuit 21'. In addition, the aforementioned 'square wave signal' is not needed to be a perfect square wave as long as the phase difference detection circuit 29' can operate adequately.

Figure 24:
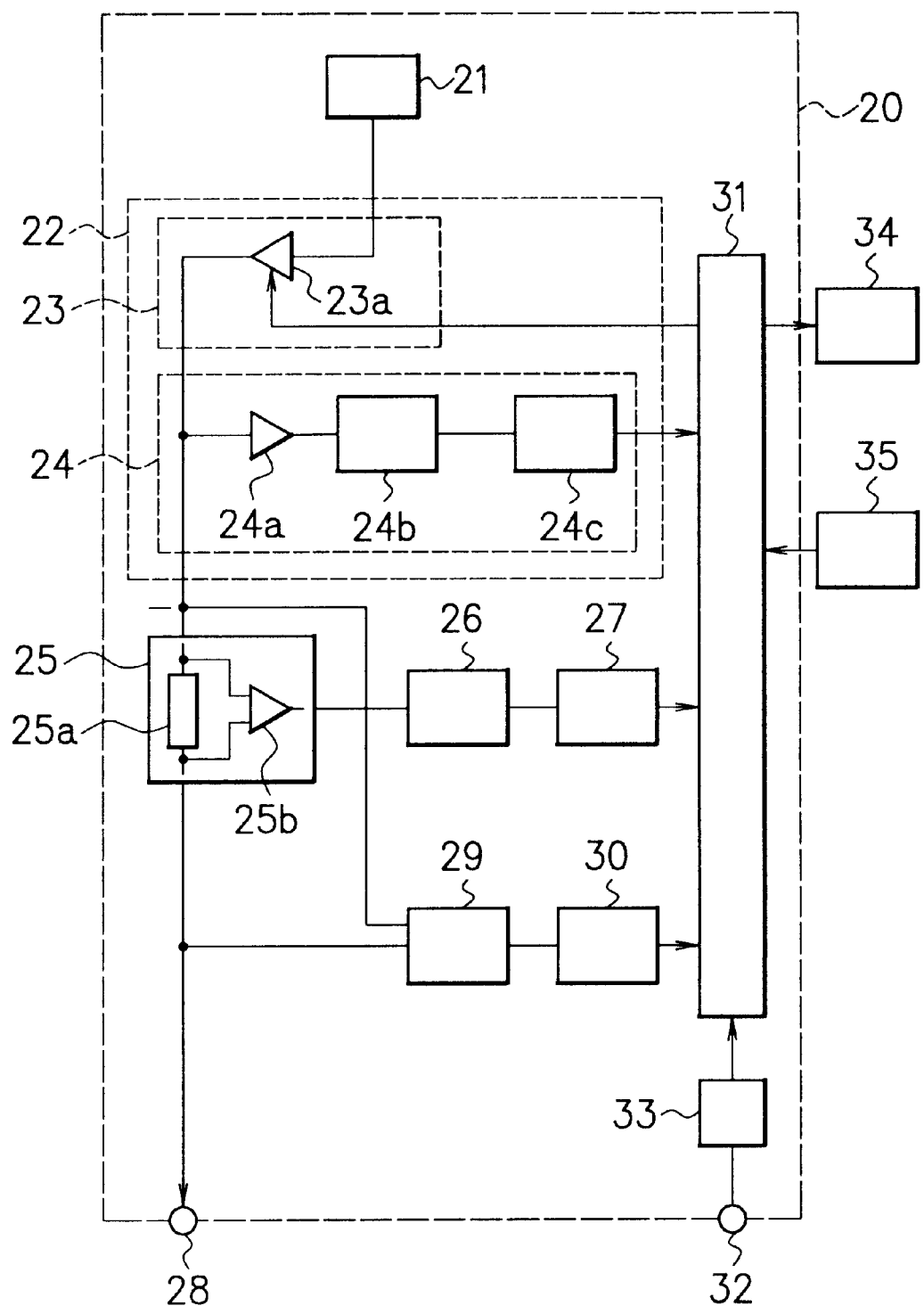
FIG. 24 is a block diagram showing a passenger detection system according to a third embodiment of the present invention.

FIG. 24 is a block diagram showing a passenger detection system according to a third embodiment of the present invention. The third embodiment is basically the same as the first embodiment, except that a seatbelt warning lamp 34 and a seatbelt status detection circuit 35, instead of the air bag unit 18, is connected to the control circuit 31 of the control unit 20. Incidentally, it is also possible to further connect the air bag unit 18 to the control circuit 31 of FIG. 24.

In the third embodiment, when it is judged by the control circuit 31 that a passenger is seated on the seat 1B according to the data concerning the transmission current and the phase difference, judgment on whether the seatbelt is fastened or not is performed by the seatbelt status detection circuit 35. In the case where the seatbelt is judged to be not fastened, the control circuit 31 sends a warning signal to the seatbelt warning lamp 34 and let the seatbelt warning lamp 34 blink, for example. In the case where the seatbelt is judged to be fastened, the control circuit 31 does not output the warning signal and the seatbelt warning lamp 34 is not illuminated. When no passenger is seated on the seat 1B, the seatbelt warning lamp 34 is not illuminated independently of the judgment by the seatbelt status detection circuit 35. Incidentally, the transmission current and the phase difference detected by the current detection circuit 25 and the phase difference detection circuit 29 when articles other than a passenger are placed on the seat 1B are obviously smaller than those when a passenger is seated on the seat 1B, since permittivity of a passenger is larger than that of articles other than a passenger. Therefore, false judgment of the seating status on the seat 1B does not occur.

According to the third embodiment, the seatbelt warning lamp 34 is blinked by the control circuit 31 when it is judged that a passenger is seated on the seat 1B but the seatbelt is not fastened. Therefore, it is possible to urge the passenger to fasten the seatbelt and improve safety of the passenger.

Incidentally, of course it is also possible to apply the seatbelt status detection circuit 35 and the seatbelt warning lamp 34 to the control unit 20' of the second embodiment.

Figure 25:
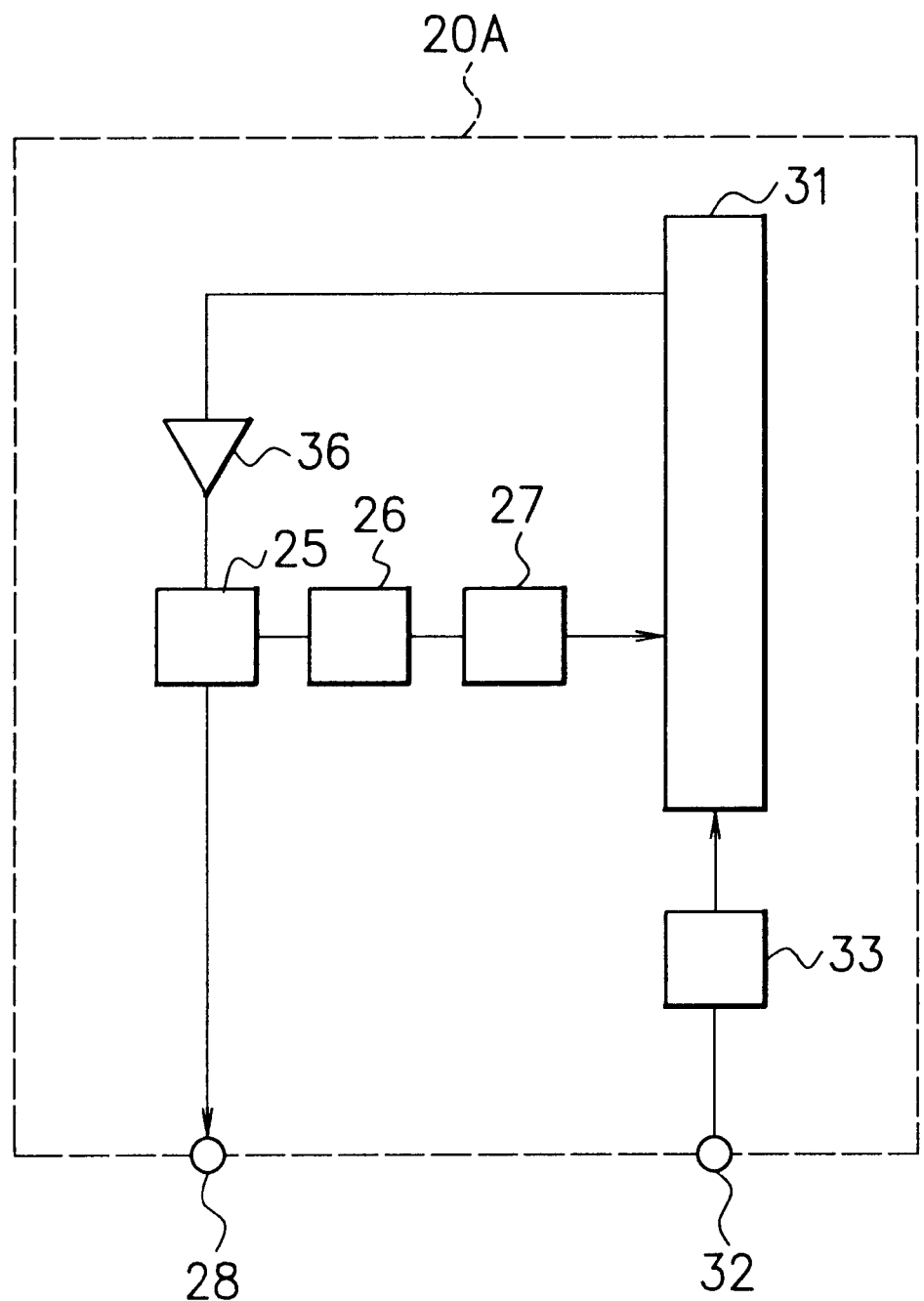
FIG. 25 is a block diagram showing a control unit of a passenger detection system according to a fourth embodiment of the present invention.

FIG. 25 is a block diagram showing a control unit 20A of a passenger detection system according to a fourth embodiment of the present invention. The control unit 20A shown in FIG. 25 has composition similar to the control unit 20 of FIG. 11, except that the oscillation circuit 21, the amplitude control circuit 22 and the phase difference detection circuit 29 of FIG. 11 are not employed in the control unit 20A of FIG. 25. In the control unit 20A, the oscillation signal is generated by the control circuit 31 and a buffer 36. Generally, the control circuit 31 including an MPU has capability of generating a high frequency low voltage signal using its timer function etc. Therefore, it is possible for the control circuit 31 to generate a high frequency low voltage signal utilizing the uniform DC power voltage supplied from the power circuit 33 and the clock signal supplied thereto. The amplitude control circuit 22 can be omitted in the case where variation of the DC power voltage is small and oscillation output with constant voltage amplitude can be done precisely by the control circuit 31, or in the case where the judgment of the seating status on the seat 1B has large tolerance. Incidentally, it is also possible to omit the buffer 36 if interference by noise is negligible.

According to the fourth embodiment, circuit composition of the control unit of the passenger detection system can be considerably simplified. Therefore, the control unit 20A can be further miniaturized and cost for the passenger detection system can be further reduced in comparison with the first and second embodiments. Incidentally, it is also possible to provide the seatbelt status detection circuit 35 and the seatbelt warning lamp 34 of the third embodiment to the control unit 20A of the fourth embodiment.

Figure 26:
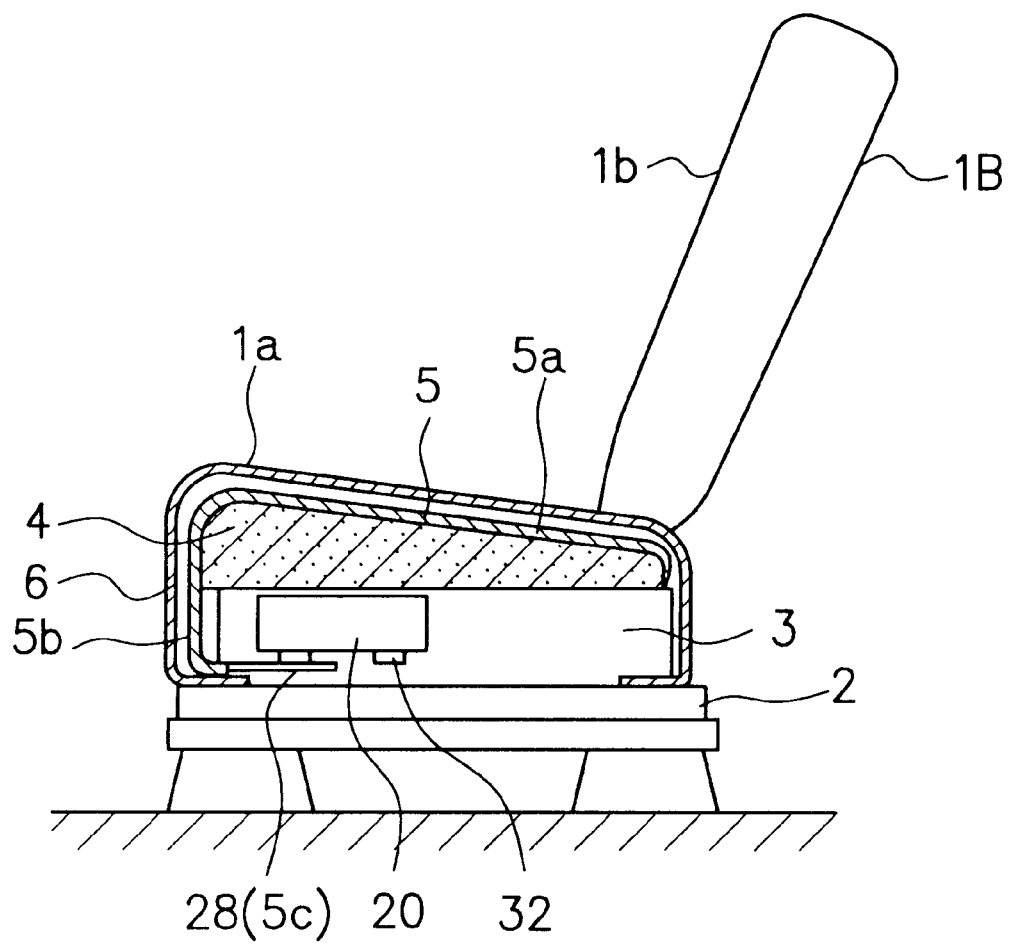
FIG. 26 is a partly sectional fragmentary schematic illustration of a seat which is provided with a passenger detection system according to a fifth embodiment of the present invention.

FIG. 26 is a partly sectional fragmentary schematic illustration of a seat which is provided with a passenger detection system according to a fifth embodiment of the present invention. The passenger detection system of the fifth embodiment is basically the same as the passenger detection system of the first embodiment, except that the antenna section 5a of the antenna electrode 5 is provided so as to cover the entire upper side of the cushion section 1a of the seat 1B and the conduction section 5b of the antenna electrode 5 is placed on the front side of the cushion material 4 so as to reach the seat frame 3 on which the control unit 20 is installed.

Figure 27A:
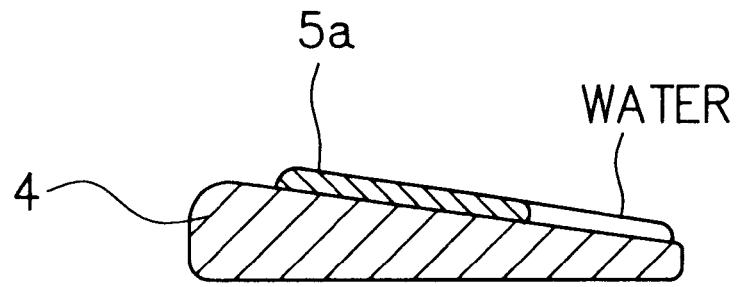
FIG. 27A and FIG. 27B are schematic diagrams showing the advantage of an antenna section according to the fifth embodiment.
Figure 27B:
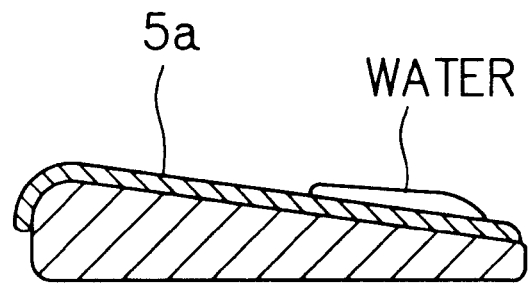

FIG. 27A and FIG. 27B are schematic diagrams showing the advantage of the antenna section 5a according to the fifth embodiment. When water spilled on the seat 1B and the seat 1B is wet with water as shown in FIG. 27A, the virtual area of the antenna section 5a becomes large due to the water, thereby the properties of the antenna electrode 5 is changed. However, if the antenna section 5a is provided so as to cover the entire upper side of the cushion section 1a of the seat 1B according to the fifth embodiment, the spilled water does not increase the virtual area of the antenna section 5a as shown in FIG. 27B, and thus the effect of the spilled water on the properties of the antenna electrode 5 is minimized.

As described above, according to the fifth embodiment, the antenna section 5a of the antenna electrode 5 is provided so as to cover large area on the cushion section 1a of the seat 1B. Therefore, the effect of spilled water etc. on the properties of the antenna electrode 5 can be minimized, and thus errors due to spilled water etc. can be prevented in the judgment of the seating status on the seat 1B. Incidentally, it is also possible to apply the antenna section 5a of the fifth embodiment to the second, third and the fourth embodiments.

Figure 28A:
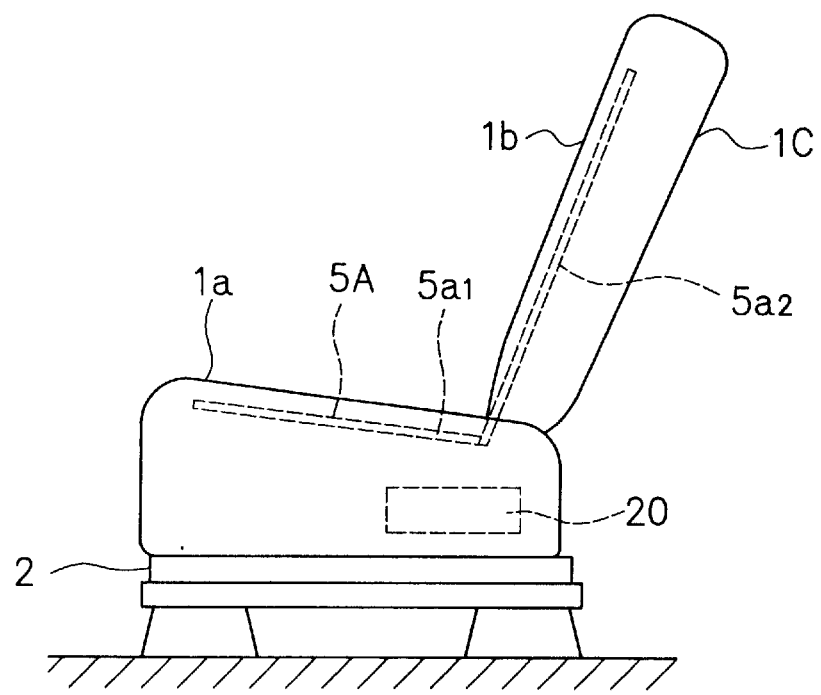
FIG. 28A is a schematic illustration of a seat which is provided with a passenger detection system according to a sixth embodiment of the present invention.
Figure 28B:
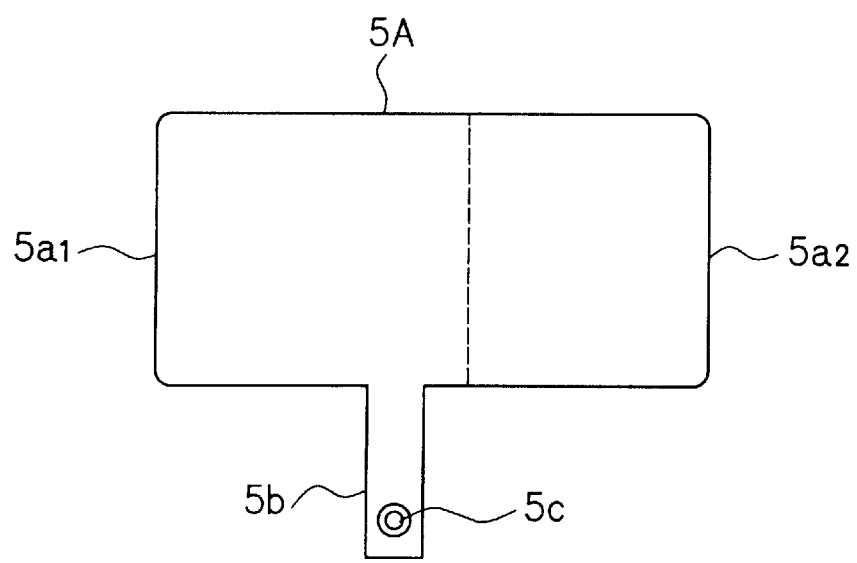
FIG. 28B is a plan view of an antenna electrode of the sixth embodiment.

FIG. 28A is a schematic illustration of a seat which is provided with a passenger detection system according to a sixth embodiment of the present invention. The passenger detection system of the sixth embodiment is basically the same as the passenger detection system of the first embodiment, except that an antenna electrode 5A is provided to both the cushion section 1a and the back section 1b of a seat 1C. FIG. 28B is a plan view of the antenna electrode 5A of the sixth embodiment. The antenna electrode 5A is composed of an antenna section 5a1 for being provided to the cushion section 1a of the seat 1C, an antenna section 5a2 for being provided to the back section 1b of the seat 1C, a conduction section 5b which is formed by extending the antenna section 5a1 laterally with an width narrower than the antenna section 5a1, and a connector 5c which is fixed to the end of the conduction section 5b keeping electrical connection with the conduction section 5b. The end of the conduction section 5b reaches the control unit 20 via the side of the seat 1C, and the connector 5c on the end of the conduction section 5b is connected to the connector 28 of the control unit 20.

According to the sixth embodiment, precision of the judgment of the seating status on the seat 1C can be improved due to the large area of the antenna electrode 5A. Incidentally, the areas of the antenna sections 5a1 and 5a2 can be properly determined and altered according to the areas of the cushion section 1a and the back section 1b of the seat 1C. In addition, it is also possible to apply the antenna sections 5a1 and 5a2 of the sixth embodiment to the second, third and the fourth embodiments.

As set forth hereinabove, in the passenger detection system according to the present invention, a weak alternating electric field is generated around an antenna electrode which is placed on the upper side of a seat, and a transmission current which passes between the oscillation circuit and the antenna electrode is detected by a current detection circuit etc. The amount of the transmission current varies depending on what is placed on the seat, and the transmission current becomes especially large when a passenger is seated on the seat. There exists obvious difference of the amount of the transmission current between the case where a passenger is seated on the seat and other cases. Therefore, the presence or absence of a passenger seated on the seat can be detected based on the detection of the transmission current by the current detection circuit.

Especially, the passenger detection system according to the present invention needs only one antenna electrode, therefore circuit composition of the system can be simplified compared to the passenger detection system needing a plurality of electrodes which have lately been proposed by the present inventors, and thus cost for the system can be reduced.

By additional use of a phase difference detection circuit for detecting a phase difference between an oscillation signal which is supplied from the oscillation circuit and an output signal which is supplied to the antenna electrode, the presence or absence of a passenger seated on the seat can be detected more precisely and correctly. The amount of the phase difference varies depending on what is placed on the seat, and the phase difference becomes especially large when a passenger is seated on the seat. There exists obvious difference of the amount of the phase difference between the case where a passenger is seated on the seat and other cases. Therefore, the presence or absence of a passenger seated on the seat can be detected based on the detection of the phase difference by the phase difference detection circuit. Incidentally, of course it is also possible to compose a passenger detection system employing the phase difference detection circuit only, i.e. without the current detection circuit.

By utilizing a single uniform DC power voltage generated by a power circuit as the system power source for the control unit of the passenger detection system, circuit composition of the control unit is simplified, and thus cost for the system is further reduced.

By additional use of an amplitude control circuit for regulating voltage amplitude of the oscillation signal to a fixed value, variation of the voltage amplitude of the oscillation signal is avoided. Therefore, the detection of a passenger seated on the seat can be executed with precision and reliability, only by simple comparison of the transmission current detected by the current detection circuit with a threshold value.

By forming a conduction section of the antenna electrode by extending part of the antenna section and connecting a connector on the end of the conduction section to a connector of the control unit which is installed on the seat, wire harness for connecting the antenna section and the control unit becomes unnecessary, and thus cost for the system can be further reduced.

Further, by employing an oscillation circuit which generates a high frequency low voltage square wave signal, composition of the control unit can be simplified, and thus cost for the system can be further reduced. The MPU included in the control circuit can also be utilized as the oscillation circuit for generating the high frequency low voltage square wave signal.

By employing an antenna section of the antenna electrode which covers large area on the cushion section, the effect of spilled water etc. on the properties of the antenna electrode can be minimized, and thus errors due to spilled water etc. can be prevented in the judgment of the seating status on the seat.

By employing a large antenna section of the antenna electrode which is provided to both the cushion section and the back section of the seat, precision of the judgment of the seating status on the seat can be improved due to the large area of the antenna electrode.

When the passenger detection system according to the present invention is applied to air bag systems, setting of the air bag unit into the deployment mode, the no deployment mode, etc. can be done according to the precise judgment on the presence or absence of a passenger seated on the passenger seat performed by the passenger detection system, thereby unnecessary deployment of air bags etc. can be avoided. The passenger detection system according to the present invention can also be utilized for detecting a situation where a passenger is seated on the seat but the seatbelt is not fastened, therefore it is possible to urge the passenger to fasten the seatbelt and improve safety of the passenger. Of course, the passenger detection system according to the present invention can also be employed for other usages.

While the present invention has been described with reference to the particular illustrative embodiments, it is not to be restricted by those embodiments but only by the appended claims. For example, the shape of the antenna electrode which is placed on the seat is not limited to a quadrangle which has been shown above, and the shape can be a circle, an ellipsoid, a polygon, etc. It is also possible to form the antenna section 5a and the conduction section 5b discretely and connect them by connectors provided thereto, or it is also possible to replace the conduction section 5b by a wire harness. The oscillation frequency of the oscillation circuit can be set at other than 100 Khz according to the situation in the car, targets of detection, etc., and the output voltage of the oscillator circuit can also be varied adequately. Further, application of the passenger detection system according to the present invention is not limited to front seats of cars. It is also possible to apply the passenger detection system according to the present invention to rear seats of cars or seats of other vehicles. It is to be appreciated that those skilled in the art can change or modify the embodiments without departing from the scope and spirit of the present invention.

What is claimed is:

1. A passenger detection system comprising:
   an antenna electrode which is placed on the upper side of a seat;
   an oscillation means for generating a high frequency low voltage oscillation signal in order to generate a weak alternating electric field around the antenna electrode;
   a current detection means for detecting a transmission current which passes between the oscillation means and the antenna electrode according to the weak alternating electric field which is generated around the antenna electrode; and
   a judgment means for judging the presence or absence of a passenger seated on the seat based on the output of the current detection means.

2. A passenger detection system as claimed in claim 1, further comprising an amplitude control means for controlling the voltage amplitude of the oscillation signal which is supplied by the oscillation means to the antenna electrode at an almost constant value.

3. A passenger detection system as claimed in claim 2, wherein the amplitude control means includes an amplitude detection circuit for detecting the voltage amplitude of the oscillation signal and an amplitude variation circuit for varying and controlling the voltage amplitude of the oscillation signal, and variations of the voltage amplitude of the oscillation signal is controlled by the amplitude variation circuit based on the output of the amplitude detection circuit so that the voltage amplitude will be almost constant.

4. A passenger detection system as claimed in claim 1, wherein the antenna electrode is composed of:
- an antenna section which is provided to the cushion section and/or the back section of the seat;
- a conduction section which is formed by extending part of the antenna section; and
- a connector which is provided to the end of the conduction section.

5. A passenger detection system as claimed in claim 1, wherein a control unit is made up by enclosing the oscillation means, the current detection means and the judgment means in a common housing, and the control unit is provided to the seat.

6. A passenger detection system as claimed in claim 5, wherein the housing of the control unit is provided with a connector which is connected with the oscillation means via the current detection means, and the connector on the housing of the control unit is electrically connected to a connector which is provided to the end of the antenna electrode.

7. A passenger detection system as claimed in claim 1, wherein the judgment means executes the judgment on the presence or absence of a passenger seated on the seat, by comparing the transmission current detected by the current detection means with a prestored threshold value concerning the transmission current.

8. A passenger detection system as claimed in claim 1, further comprising a power circuit for generating a single uniform DC voltage utilizing power derived from a car battery, in which the single uniform DC voltage supplied by the power circuit is utilized as the system power source for circuits in the passenger detection system including the oscillation means, the current detection means and the judgment means.

9. A passenger detection system as claimed in claim 1, wherein the antenna electrode is placed on the upper side of the seat so as to cover almost the entire upper side of the cushion section of the seat.

10. A passenger detection system as claimed in claim 1, wherein the antenna electrode is designed to be provided to both the cushion section and the back section of the seat.

11. A passenger detection system as claimed in claim 1, wherein the antenna electrode is fixed to one or more components of the seat.

12. A passenger detection system comprising:
- an antenna electrode which is placed on the upper side of a seat;
- an oscillation means for generating a high frequency low voltage oscillation signal in order to generate a weak alternating electric field around the antenna electrode;
- a current detection means for detecting a transmission current which passes between the oscillation means and the antenna electrode according to the weak alternating electric field which is generated around the antenna electrode; a phase difference detection means for detecting the phase difference between the oscillation signal supplied from the oscillation means and an output signal which is supplied to the antenna electrode; and
- a judgment means for judging the presence or absence of a passenger seated on the seat based on the outputs of the current detection means and the phase difference detection means.

13. A passenger detection system as claimed in claim 12, further comprising an amplitude control means for controlling the voltage amplitude of the oscillation signal which is supplied by the oscillation means to the antenna electrode at an almost constant value.

14. A passenger detection system as claimed in claim 13, wherein the amplitude control means includes an amplitude detection circuit for detecting the voltage amplitude of the oscillation signal and an amplitude variation circuit for varying and controlling the voltage amplitude of the oscillation signal, and variations of the voltage amplitude of the oscillation signal is controlled by the amplitude variation circuit based on the output of the amplitude detection circuit so that the voltage amplitude will be almost constant.

15. A passenger detection system as claimed in claim 12, herein the antenna electrode is composed of:
- an antenna section which is provided to the cushion section and/or the back section of the seat;
- a conduction section which is formed by extending part of the antenna section; and
- a connector which is provided to the end of the conduction section.

16. A passenger detection system as claimed in claim 12, wherein a control unit is made up by enclosing the oscillation means, the current detection means, the phase difference detection means and the judgment means in a common housing, and the control unit is provided to the seat.

17. A passenger detection system as claimed in claim 16, wherein the housing of the control unit is provided with a connector which is connected with the oscillation means via the current detection means, and the connector on the housing of the control unit is electrically connected to a connector which is provided to the end of the antenna electrode.

18. A passenger detection system as claimed in claim 12, wherein the judgment means executes the judgment on the presence or absence of a passenger seated on the seat, by comparing the transmission current detected by the current detection means with a prestored threshold value concerning the transmission current and comparing the phase difference detected by the phase difference detection means with a prestored threshold value concerning the phase difference.

19. A passenger detection system as claimed in claim 12, further comprising a power circuit for generating a single uniform DC voltage utilizing power derived from a car battery, in which the single uniform DC voltage supplied by the power circuit is utilized as the system power source for circuits in the passenger detection system including the oscillation means, the current detection means, the phase difference detection means and the judgment means.

20. A passenger detection system as claimed in claim 12, wherein the antenna electrode is placed on the upper side of the seat so as to cover almost the entire upper side of the cushion section of the seat.

21. A passenger detection system as claimed in claim 12, wherein the antenna electrode is designed to be provided to both the cushion section and the back section of the seat.

22. A passenger detection system as claimed in claim 12, wherein the antenna electrode is fixed to one or more components of the seat.

23. A passenger detection system as claimed in claim 12, wherein the phase difference detection means detects the phase difference between signals at both ends of the current detection means.

24. A passenger detection system as claimed in claim 12, wherein the phase difference detection means detects the phase difference between the oscillation signal and the output signal, by detecting the phase difference between a rising/falling edge of a square wave signal corresponding to the oscillation signal and a rising/falling edge of a square wave signal corresponding to the output signal.

25. A passenger detection system as claimed in claim 12, wherein the oscillation means generates the high frequency low voltage oscillation signal substantially in the form of a square wave.

26. A passenger detection system as claimed in claim 25, wherein an MPU (MicroProcessor Unit) is utilized as the oscillation means for generating the high frequency low voltage oscillation in the form of a square wave.

27. A passenger detection system comprising:

an antenna electrode which is placed on the upper side of a seat;

an oscillation means for generating a high frequency low voltage oscillation signal in order to generate a weak alternating electric field around the antenna electrode;

a resistance which is placed between the oscillation means and the antenna electrode;

a phase difference detection means for detecting the phase difference between the oscillation signal supplied from the oscillation means and an output signal which is supplied to the antenna electrode; and a judgment means for judging the presence or absence of a passenger seated on the seat based on the output of the phase difference detection means.

* * * * *

UNITED STATES PATENT AND TRADEMARK OFFICE
CERTIFICATE OF CORRECTION

PATENT NO. : 6,208,249 B1
DATED : March 27, 2001
INVENTOR(S) : Takashi Saito, Masahiro Ofuji, Kazunori, Jinno Page 1 of 1

It is certified that error appears in the above-identified patent and that said Letters Patent is hereby corrected as shown below:

Column 5,
Line 53, delete "i.j." insert -- i = j --

Column 16,
Line 3, delete "17" insert -- 31 --

Column 17,
Line 35, delete "SCi" insert -- SC1 --

Column 20,
Line 39, delete "a"

Signed and Sealed this

Twenty-ninth Day of January, 2002

Attest:

Attesting Officer

JAMES E. ROGAN
*Director of the United States Patent and Trademark Office*